United States Patent

Krechmery et al.

[15] 3,707,675
[45] Dec. 26, 1972

[54] MEASURING SYSTEM FOR COMPARING THE RELATIVE MAGNITUDES OF FIRST AND SECOND D.C. SIGNALS

[72] Inventors: Roger L. Krechmery; Lee A. Seabeck, both of Mentor, Ohio

[73] Assignee: Bailey Meter Company

[22] Filed: Sept. 11, 1970

[21] Appl. No.: 71,508

[52] U.S. Cl.................324/140 D, 235/194, 328/161
[51] Int. Cl. ..............................................G01r 7/00
[58] Field of Search ..............324/140 R, 140 D, 142; 328/160, 161; 235/194

[56] References Cited

UNITED STATES PATENTS 3,500,200   3/1970   Woodhead..........................324/142

*Primary Examiner*—Alfred E. Smith
*Attorney*—Joseph M. Maguire

[57] ABSTRACT

A Measuring system for comparing the relative magnitudes of a first and a second D.C. input signal by symmetrically integrating the first input signal between time period intervals proportional to its magnitude relative to the magnitude of the second input signal so that pulses are generated at a frequency which is a multiple of the integrating cycle. The variable frequency pulses are either counted directly or are converted to a frequency variable train of voltage pulses, each of the pulse cycles of the train of pulses having the corresponding periodicity of the variable input frequency and each voltage pulse having a substantially constant pulse width; the train of pulses are used to modulate a voltage source output signal which, when subsequently averaged, provides an output signal that is proportional to the product of the modulated output signal of the voltage source and the input frequency.

7 Claims, 8 Drawing Figures

INVENTORS
ROGER L. KRECHMERY
LEE A. SEABECK
BY
Joseph L. Brzuszek
ATTORNEY

INVENTORS
ROGER L. KRECHMERY
LEE A. SEABECK
BY
Joseph L. Brzuszek
ATTORNEY

INVENTORS
ROGER L. KRECHMERY
LEE A. SEABECK
BY
Joseph L. Brzuszek
ATTORNEY 3,707,675

MEASURING SYSTEM FOR COMPARING THE RELATIVE MAGNITUDES OF FIRST AND SECOND D.C. SIGNALS

BACKGROUND OF THE INVENTION

1. Field of the Invention

The present invention relates generally to measuring apparatus, which can be utilized in an electromagnetic flowmeter of the type in which an electrical signal is induced in a fluid flowing through a magnetic field, the electrical signal having a magnitude which, among other things, is directly proportional to the intensity of the magnetic field and the velocity at which the fluid is flowing through the field.

The invention is particularly applicable to measuring fluid flow through a conduit or liner and will be described with particular reference thereto although it will be appreciated that the invention has broader applications such as where the relative motion between the fluid and the magnetic field is the variable to be measured. The invention is thus suitable for measuring the rate at which a carrier of the measuring apparatus is moving through a fluid medium.

2. Description of the Prior Art

Electromagnetic flowmeters have heretofore comprised exciter means for establishing a magnetic field substantially perpendicular to the direction of relative fluid motion, means for sensing an electrical signal induced by fluid flow through the magnetic field, and means for responding to the sensing means to provide an indication of fluid flow.

In such a flowmeter, the exciter means for establishing a magnetic field has taken the form of either a D.C. exciter or an A.C. exciter. The D.C. exciter produces a magnetic field having a steady amplitude and direction, a D.C. voltage being induced in the fluid having an instantaneous amplitude which is directly proportional to the velocity of fluid flow. In contrast, the A.C. exciter produces a magnetic field having a variable amplitude which alternates or periodically reverses its direction. An A.C. voltage of the same frequency as the exciter means is induced in the fluid having an instantaneous amplitude directly proportional to the velocity of fluid flow and phase shifted by an angle of +90° and –90°, with respect to the phase of the A.C. exciter voltage, at opposite ends of a diameter of the fluid that is substantially normal to both the magnetic flux field and the direction of flow.

In both the D.C. and A.C. exciter types of electromagnetic flowmeters, the means for sensing the electrical signal induced by fluid flow through the magnetic field has generally included a pair of electrodes electrically contacting the fluid, although magnetic field sensors not in contact with the fluid have also been used. In the electrode arrangement, the electrodes are usually placed at opposite ends of a diameter of a non-magnetic, electrically non-conductive conduit or liner through which the fluid to be measured flows. The electrode axis is oriented to be substantially normal to both the magnetic flux field and the direction of flow in order to sense the maximum electrical signal induced in the fluid.

It has been found in most applications that when using a D.C. exciter means, the electrodes become polarized due to an accumulation of an electrical charge thereon, and this charge severely limits the accuracy of the flowmeter since it masks the D.C. signal that is directly proportional to the velocity of fluid flow. Frequent discharging of the electrodes is, at best, an intolerable solution to this problem.

The use of an A.C. exciter means prevents polarization of the electrodes by producing a magnetic field which periodically reverses its direction frequently enough to preclude the accumulation of charge. For practical operation, and to provide useful induced signals, even though they have a relatively small signal to noise ratio before amplification, the A.C. exciter means is generally preferred.

The means for responding to the sensing means to provide an indication of fluid flow have heretofore taken a variety of forms. These responding means have included primary means for balancing, isolatingly coupling and preamplifying the induced electrical signal from the sensing means along with secondary means, magnetically coupled to the primary means, to produce an output signal which provides a measurement of fluid flow.

One of the principal problems inherent in electromagnetic flow meters using A.C. exciter means is that the alternating flux induces error voltages of considerable magnitude in various parts of the system which mask the flow signal and cause the flowmeter to register other than zero for zero fluid flow. These error voltages may be grouped into two categories: namely, error voltages which are in phase with the induced flow signal, and error voltages which are in phase-quadrature (±90° out of phase) with respect to the induced flow signal. The in-phase error voltages are generally attributed to eddy currents being generated in the fluid and to artificial flow signals due to the apparent motion of the magnetic flux field with respect to a stationary fluid. The phase-quadrature error voltages are generally attributed to loop voltages magnetically coupled from the finite loop formed through the fluid by the electrodes and their connections along with capacitively coupled voltages from the exciter means. These error voltages are more or less interdependent and vary with the flow head structure and the conductivity and dielectric constant of the fluid to be measured.

Another important problem inherent in this type of electromagnetic flowmeter is caused by the amplitude and frequency fluctuations from conventional sources of power which generally are used to supply power to the exciter means. When the amplitude and frequency of the source of power are not perfectly controlled, the magnetic flux field produced by the exciter means will fluctuate accordingly, and the flow signal induced in the fluid will not provide a useful indication of the velocity of fluid flow. It is, therefore, desirable to provide a reference means which will compensate for both the amplitude and frequency fluctuations of the exciter means in order to provide an accurate measurement of fluid flow.

The ultimate problem in the design and operation of an electromagnetic flowmeter is in the selection and integration of component elements into a flowmeter system which overcome all of the above-referred problems, and others, and which inherently does not present insoluble problems. Heretofore, devices have been known which will convert an A.C. signal to a proportional D.C. signal coupled to other devices which can generate pulses having a frequency more or less proportional to that signal, but such systems have been thought to be generally rather non-linear, inaccurate, and subject to drifts, and, for these reasons, have not been successfully used in flowmeter systems.

The present invention contemplates a new and improved apparatus which overcomes all of the above-referred problems, and others, and provides a measuring system which is stable, linear and accurate.

SUMMARY OF THE INVENTION

In accordance with the present invention, a measuring system for comparing the relative magnitudes of a first and a second D.C. input signal is provided, comprising: means for symmetrically integrating the first D.C. signal between time period intervals proportional to its magnitude relative to the magnitude of the second D.C. signal; switching means for periodically reinitiating the symmetrical integrating cycle; and, pulse generating means responsive to the half-period cycles of the symmetrical integrating means so that output pulses are generated at a frequency which is a multiple of the integrating cycle.

Further, in accordance with the invention, a frequency to voltage converter is provided, including: means for producing a frequency variable train of pulses, each of the pulse cycles of the train of pulses having the corresponding periodicity of the variable input frequency and each pulse having a substantially constant pulse width; means for voltage converting the pulse cycles of the train of pulses to form a substantially square wave signal varying plus and minus of a reference level, the deviations of one polarity having a substantially constant width synchronized with the constant width pulses and the deviations of the other polarity being synchronized with the remainder of each pulse cycle; a voltage source having an output signal; series-shunt chopper means coupled to the square wave signal for modulating the voltage source output signal during the deviations of one polarity; and means for averaging the modulated output signal of the voltage source to provide an averaged output voltage which is proportional to the product of the modulated output signal of the voltage source and the input frequency.

In accordance with a more limited aspect of the invention, a phase sensitive demodulator is provided, including: means for synchronizing the phase of an A.C. signal with the phase of the induced flow signal and series-shunt chopper means, coupled to the A.C. signal from the synchronizing means, for demodulating half-cycles of the induced flow signal and for rejecting error signals which are in phase-quadrature with the flow signal.

The principal object of the present invention is to provide a measuring system which produces a stable, linear and accurate response indication which is particularly suitable for fluid flow measurement.

DESCRIPTION OF THE PREFERRED EMBODIMENTS

Figure 1:
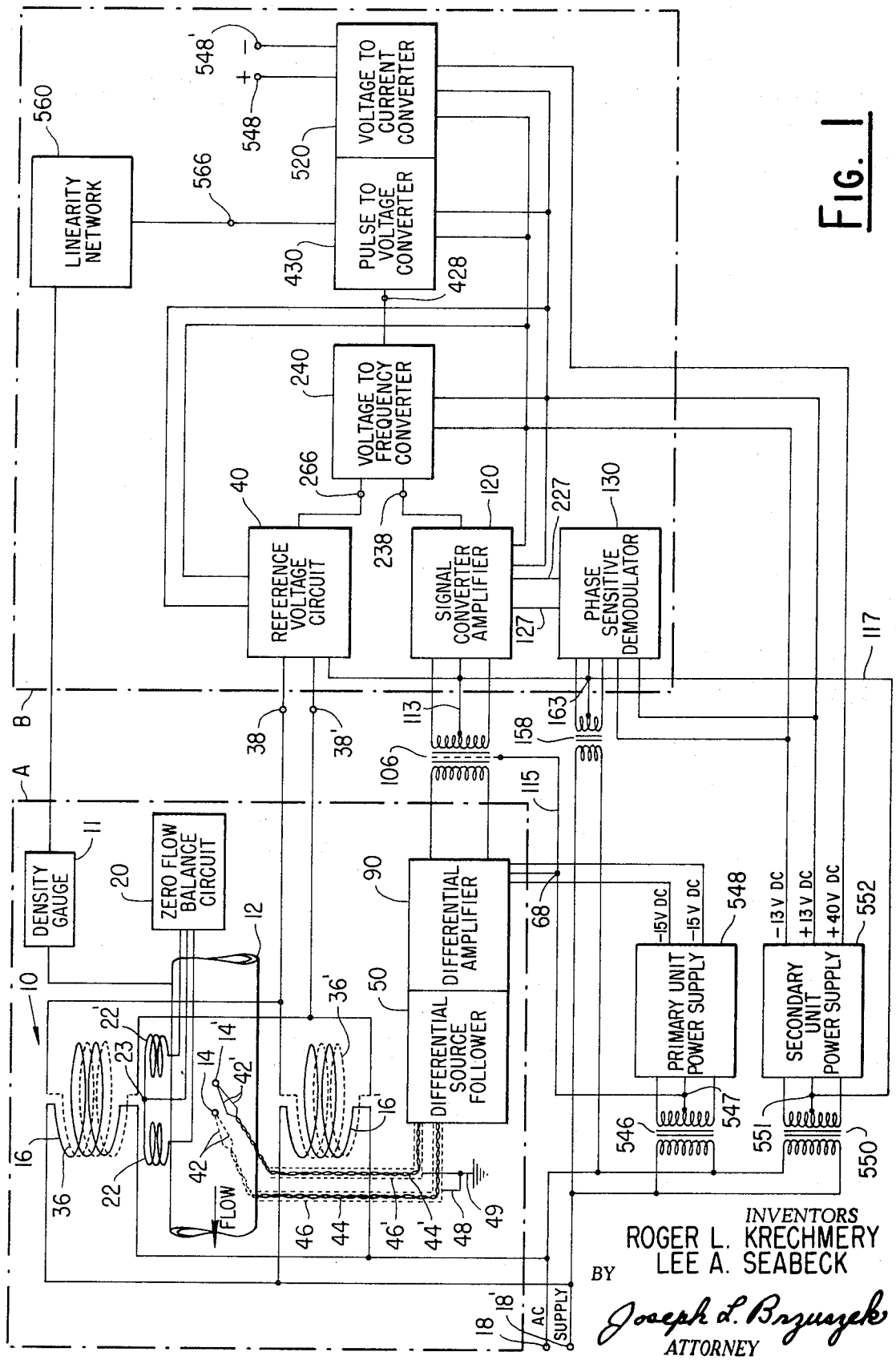
FIG. 1 is a block diagram of the invention as used in an electromagnetic flowmeter.

Referring now to the drawings wherein the showings are for the purposes of illustrating the preferred embodiments of the invention only and not for the purposes of limiting same, FIG. 1 is a block diagram illustration of the invention as used in an electromagnetic flowmeter which provides an indication of fluid flow.

The present flowmeter includes a primary unit A and a secondary unit B. The primary unit A includes a flow head assembly 10 with a zero flow balance circuit 20, a differential source follower 50 and a differential amplifier 90 proximately located thereto. The secondary unit B is coupled to the primary unit A by a transformer 106, and the secondary unit B includes a signal converter amplifier 120, a phase sensitive demodulator 130, a reference voltage circuit 40, a voltage to frequency converter 240, a pulse to voltage converter 430, and a voltage to current converter 520. The present flowmeter is adapted to measure mass flow by the inclusion of a density gage 11 in the primary unit A coupled to a linearity network 560 in the secondary unit B.

A conventional A.C. source of power is connected across terminals 18, 18' in order to provide the operating power for the flowmeter system. A suitable and readily available supply voltage for the flowmeter system is 118 ±10 volts A.C. with a frequency of 50 ±5 or 60 ±5 cycles per second (cps). It should be recognized that it is within the ability of a skilled worker in the art to make the necessary modifications in the system in order for it to operate on various other supply voltages and supply frequencies for particular applications wherein this is deemed necessary. The supply voltage is coupled through a transformer 546 to a primary unit power supply 548 which may take the form of a conventional full wave rectifier and filter circuit arranged to provide two D.C. voltage outputs of equal magnitude and opposite polarity. A regulated +15 volts and −15 volts is provided in this way by the primary unit power supply 548 in order to supply the operating voltages for primary unit A. The supply voltage is also coupled through a transformer 550 into a secondary unit power supply 552 in order to provide three D.C. voltage outputs, +40 volts, +13 volts and −13 volts. The three voltages from the secondary unit power supply 552 provide the operating voltages for the secondary unit B of the flowmeter system. The provision of the primary and secondary unit power supplies insures that the primary unit is isolated from the secondary unit. Just as with the magnitude of the supply voltage, the particular values of voltages specified for the power supplies 548, 552 is not critical to the principle on which the flowmeter system operates, but is specified merely to provide a complete and adequate disclosure.

The input supply voltage is also coupled through transformer 158 into the phase sensitive demodulator 130, and the secondary winding of each of the transformers 106, 158 and 550 are center-tapped at 113, 163 and 551, respectively, and connected in common by a conductor 117 which provides the ground reference for the secondary unit B. The ground reference for the primary unit A is taken from a center tap 547 of transformer 546 and this point is also connected to the case of transformer 106 by conductor 115 in order to shield the primary unit A from the secondary unit B.

The voltage to current converter 520 in the secondary unit B is particularly suited to provide a D.C. output current at terminals 548 – 548' in the range of either 4–20 milliamperes (ma) or 10–50 ma in order to be compatible with the use of conventional D.C. current responding indicators of a precise nature.

THE PRIMARY UNIT

Figure 2:
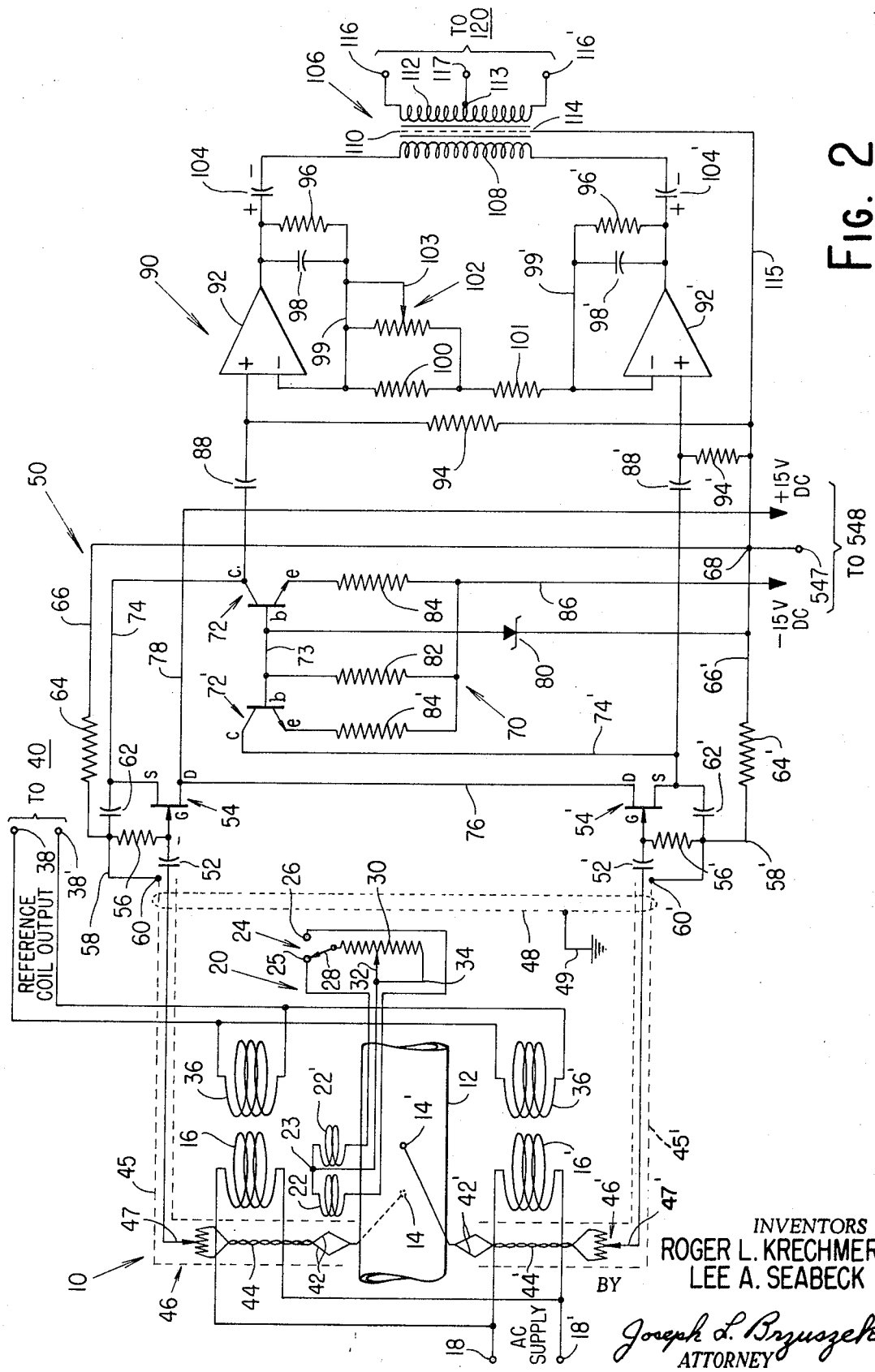
FIG. 2 is a schematic diagram of the primary circuits in the flowmeter.

A schematic diagram of the primary unit A of FIG. 1 is illustrated in FIG. 2. The flow head assembly 10, the zero flow balance circuit 20, the differential source follower 50 and the differential amplifier 90 are correspondingly numbered. The flow head assembly 10 includes a non-magnetic, electrically nonconductive conduit or liner 12 through which the fluid to be measured flows. Exciter means for establishing a magnetic field substantially perpendicular to the direction of relative fluid motion takes the form of a pair of coils 16, 16' which are shown connected in parallel across the supply voltage terminals 18, 18'. The use of primed numbers should be understood to designate symmetry in parameters, structure and function with respect to the elements designated by the corresponding unprimed numbers.

A means for sensing an electrical signal induced by fluid flow through the magnetic flux field generated by the A.C. voltage applied to the coils 16, 16' takes the form of electrodes 14, 14' at opposite ends of a diameter of the conduit 12 and oriented perpendicularly with respect to the magnetic flux field generated by coils 16, 16'. The electrodes 14, 14' are placed in electrical contact with the fluid flowing through liner or conduit 12 in order to sense the electrical signal induced in the moving fluid flowing through the magnetic flux field in the conduit 12 according to Faraday's law of electromagnetic induction. The design of coils 16, 16' may be such as to provide either a uniform magnetic field within the flow conduit 12 in the region of the electrode axis 14, 14' or a non-uniform field distribution. The choice of coil design, providing uniform magnetic fields, depends largely on whether or not the fluids to be measured will have an axis symmetrical velocity profile in the effective magnetic field within the conduit 12. Axis symmetrical velocity profile refers to a constant value of fluid velocity around the periphery of any circle with an arbitrary radius measured from the flow axis in a plane perpendicular to the flow axis and within the domain of the effective magnetic field. A particularly well suited coil design for establishing a uniform magnetic field within the conduit 12 is disclosed and claimed in a copending U.S. application, Ser. No. 77,905, filed Oct. 5, 1970. A coil design of this type may be used for producing a uniform magnetic field as defined in this copending U.S. APPLICATION.

The electrode 14 is connected to a pair of conductors 42 which are formed into a loop perpendicular to and within the domain of the magnetic field established by coils 16, 16'. The conductors 42 are twisted together at 44 and are connected across a potentiometer 46 having a movable contact arm 47. A similar pair of conductors 42' are connected to electrode 14' and are twisted at 44' and connected across potentiometer 46' having a movable contact arm 47'. The movable contact arms 47, 47' are connected through coupling capacitors 52, 52' respectively into the respective inputs of the differential source follower 50. A metallic shield 45 driven at point 60 by the differential source follower 50 extends from the connection at the differential source follower 50 to the loop formed by conductors 42 in the vicinity of the electrode 14. This arrangement provides an effective shield to prevent picking up stray signals which would reduce the effective capacitance of the cable and substantially eliminates the introduction of stray signals into the differential source follower 50. A similar shield arrangement 45' is provided for the coupling between electrode 14' and coupling capacitor 52'.

According to Faraday's law, the voltage induced in the fluid by its motion with respect to the magnetic field has an instantaneous value which is proportional to the mean velocity of fluid flow but has a phase difference of ±90° with respect to the instantaneous magnitude of the A.C. magnetic flux field through which it flows. The effect of the conductor loops 42, 42' exposed to the magnetic field is thus to purposely pick up a voltage caused by the changing magnetic field and superimpose this voltage with the voltage sensed by the electrodes in contact with the fluid. The provision of potentiometers 46, 46', connected to the loops 42, 42', forms an electrical bridge which can be balanced by adjustment of movable contact arms 47, 47' in order to eliminate the quadrature voltage that would otherwise be conducted to the inputs of the differential source follower 50. When the potentiometer 46 is properly adjusted, the signal at its movable contact arm 47 will be the signal sensed by electrode 14, and, similarly, when potentiometer 46' is properly adjusted, the signal on its movable contact arm 47' will be the signal sensed by the electrode 14'. A metal grounding shield 48 is provided so as to encircle the driven shield 45, 45' in order to further eliminate capacitively coupled signals between the inputs to the differential source follower 50. The shield 48 may either be grounded to the primary unit A ground reference at point 49 or may be connected to a third electrode in the conduit 12 placed on a line bisecting the axis formed by the electrodes 14, 14'. The third electrode, like the electrodes 14, 14', is placed in electrical contact with the fluid flowing through conduit 12, but it does not sense an electrical signal induced in the fluid because it is oriented parallel to the direction of the magnetic field generated by coils 16, 16'. The third electrode, therefore, would only serve to provide a fluid reference ground for the metallic grounding shield 48.

The zero flow balance circuit 20 includes a pair of coils 22, 22', each having one of their terminals connected in common at point 23. The coils 22, 22' are disposed symmetrically with respect to the common axis joining the exciter coils 16, 16' and interposed between the flow conduit 12 and either of these exciter coils. The balance coil 22 is connected to a fixed contact 26 of a single pole, double throw switch 24, and the remaining terminal of balance coil 22' is connected to the other fixed contact 25 of switch 24. The switch 24 has a movable switch arm 28 which is connected to a potentiometer 30, and the other terminal of potentiometer 30 is connected by a conductor 34 to the movable contact arm 32 of potentiometer 30. The movable contact 32 is connected to the common terminal connection 23 between coils 22, 22'.

The zero flow balance circuit 20 is adjusted by varying the position of the movable contact arm 32 of potentiometer 30 in order to eliminate in-phase error voltages generally due to eddy currents generated in the fluid and artificial flow signals due to the apparent motion of the magnetic flux field with respect to a stationary fluid. When the movable switch arm 28 contacts fixed contact 25, a variable resistance in series with coil 22' is provided. It is then possible to introduce a variable resistive loss in this circuit by moving contact arm 32 until the inphase error voltages are eliminated. If it is not possible to eliminate these error voltages with the movable switch arm 28 in this position, the movable switch arm 28 is shifted so that it contacts fixed contact 26 so as to form a series circuit with coil 22. The movable contact arm 32 is again adjusted until the in-phase error voltages are eliminated from the flow signal. The operation of balancing coils 22, 22' in this way makes it possible to provide a solid zero flow signal to the input of differential source follower 50. This makes it possible for the flowmeter to operate substantially independent of the conductivity and dielectric constant of the fluid to be measured. A simple adjustment of movable contact arm 32 compensates for the characteristics of different fluids flowing through the conduit 12. It should be recognized that the same result may be achieved by operating coils 22, 22' simultaneously by connecting potentiometer 30 directly across the coils 22, 22' and changing the position of the movable contact arm 32 so as to introduce an unequal resistance into both legs of the circuit thus formed.

The action of the zero flow balancing circuit 20, as described above, also tends to eliminate losses which are non-homogenous and are caused by lack of symmetry in the magnetic structure of the flow head assembly 10 and the fluid to be measured. This lack of symmetry can cause a rotating flux vector to exist in the area of electrodes 14, 14', and this produces a fictitious flow signal at zero fluid flow. The magnetic coupling action between the balancing coils 22, 22' and the exciter coils 16, 16' symmetrizes the losses and causes the rotating flux vector to stop, thus providing a zero output at zero flow.

The flow head assembly 10 also includes a pair of reference coils 36, 36' connected in parallel and providing a voltage signal at the output terminals 38, 38'. The voltage signal at terminals 38, 38' is conducted to the reference voltage circuit 40 located in the secondary unit B of FIGS. 1 and 3, and a description of its function therein will be considered with reference to FIG. 3. The windings of coil 36 are contiguous with the windings of exciter coils 16 except for an insulating medium electrically isolating the coils. The voltage applied to coil 16 is thus coupled by transformer action to coil 36 in a 1:1 ratio, and a similar coupling of the voltage applied to coil 16' is induced in coil 36' so that the voltage at the reference coil output terminals 38, 38' is of the same magnitude as the exciter voltage and also has the same frequency. The usefulness of this reference signal will be discussed hereinafter.

The substantially error-free signal voltages from the flow head assembly 10 are coupled into the differential source follower 50 through coupling capacitors 52, 52'. Since the remainder of the circuits in the primary unit A are substantially symmetrical with respect to their operation on each of the flow signals, the description of the remainder of primary unit A in FIG. 2, with minor exceptions, will be with reference to the elements designated by unprimed numbers. The coupling capacitor 52 is connected to a gate terminal (G) of a field effect transistor (FET) 54 also having a drain (D) terminal and a source (S) terminal designated accordingly. The FET 54 is a member of a class of transistor devices which may be switched from a low resistance state to a high resistance state by the application of a potential difference between two of its terminals. The FET 54 is of the type known as N-channel in that the resistance from the drain to source terminals switches from a low to high resistance state when the potential difference between the gate to source terminals is changed from zero to a negative value, thus diminishing the drain current of the device. The N-channel FET 54 is generally biased so that the drain terminal is positive in potential with respect to the source terminal.

A resistor 56 is connected between the junction common to coupling capacitor 52 and the gate terminal of the FET 54, and a resistor 64 is connected to its remaining terminal in order to provide a series circuit leakage path therethrough and through conductor 66 to reference point 68 for the primary unit A. The junction between resistors 56, 64 is connected through conductor 58 to the signal shield 45 at point 60 for the driving point connection. This junction between resistors 56, 64 is also connected to a capacitor 60 which has its remaining terminal connected to the source terminal of FET 54. The drain terminals of FET's 54, 54' are connected in common by conductor 76, and these drain terminals are maintained at a positive source of potential by the connection through conductor 78 to a regulated D.C. voltage as provided by primary unit power supply 548.

The differential source follower 50 also includes a pair of D.C. current generators generally designated 70. A current generator here includes an NPN transistor 72 having base (b), emitter (e) and collector (c) terminals correspondingly designated. The base of transistor 72 is connected to the base of a similar transistor 72' by conductor 73. The emitter of transistor 72 is connected to a bias resistor 84 which is connected through a conductor 86 to a source of D.C. potential negative in polarity with respect to the source of potential connected to the drain terminals of FET's 54, 54'. The magnitude of this negative source potential is regulated so as to have the same magnitude as the above-mentioned positive source of potential in the primary unit power supply 548. The emitter of transistor 72' is connected through a bias resistor 84' which has the same value of resistance as resistor 84 and is also connected to conductor 86. A Zener diode 80 has its anode terminal connected to the base terminals of transistors 72, 72' through conductor 73 and its cathode terminal connected to the ground reference point 68 for the primary unit A. The collector terminal of transistor 72 is connected to the source terminal of FET 54 through conductor 74, and this collector terminal is also connected through a coupling capacitor 88 to the input of the differential amplifier 90.

The D.C. current generators 70 as above described in such as to provide current sources which act as high, dynamic resistors rather than constant value resistors. The differential source follower 50 thus operates as a high input impedance device in order to isolate the flow head assembly 10 from the differential amplifier 90, as well as for driving the signal shields 45, 45' and providing a unity gain for the flow signal.

The coupling capacitors 88, 88' function to eliminate any D.C. component of the isolated flow signal from being coupled to differential amplifier 9 in the same way that coupling capacitors 52, 52' eliminate any D.C. component of the balanced flow signal from being coupled to the input of the differential source follower. The differential amplifier 90 includes a pair of operational amplifiers 92, 92' connected for push-pull operation. The isolated flow signal coupled through capacitor 88 is connected to the positive input terminal of operational amplifier 92, and a biasing resistor 94 is connected from this positive input terminal to the ground reference 68 for the primary unit A. The output terminal of operational amplifier 92 is connected through a high frequency noise filter including resistor 96 and capacitor 98 connected in parallel and in feedback through conductor 99 to the negative input terminal of operational amplifier 92. The positive terminal of a polarized capacitor 104 is also connected to the output terminal of operational amplifier 92, and its negative terminal is connected through the primary winding 108 of an output transformer 106 to the negative terminal of a series opposing polarized capacitor 104' which in turn has its positive terminal connected to the output terminal of operational amplifier 92'. The operational amplifier 92' also has a high frequency noise filter including a resistor 96' and a capacitor 98' connected in parallel and in feedback through conductor 99' to the negative input terminal of operational amplifier 92'.

The differential amplifier 90 has a common gain adjusting network for both operational amplifiers 92, 92' connected between the negative input terminals of both of these amplifiers. The common gain adjusting network includes resistors 100 and 101 connected in series between conductors 99, 99' and a potentiometer 102. The potentiometer 102 has a movable contact arm 103 and one of its remaining terminals connected in common to conductor 99 and the other terminal connected to the junction between resistors 100 and 101. The structure of the differential amplifier 90 as described is such as to provide the same value of input impedance to the flow signals coupled through capacitors 88, 88', and, therefore, equal loading on each leg of the differential source follower 50. This differential amplifier circuit also provides enhanced common mode rejection characteristics so as to eliminate any false signals from being produced at the output terminals of operational amplifiers 92, 92'.

The output transformer 106 of the primary unit A also includes a secondary winding 112 and a case shield 110 which is connected at point 114 and by conductor 115 to the primary reference ground 68. The secondary winding 112 is center tapped at point 113 in order to provide the secondary reference ground 117 for the secondary unit B in FIG. 1 and is also shown in the conjoint schematic diagram of FIGS. 3–5 inclusive. The transformer 106 is chosen to have a voltage gain from the primary winding 108 to the secondary winding 112 of about 1:1.5 so that a maximum flow rate signal of 300 millivolts on the primary winding 108, gain adjusted by potentiometer 102, will provide a 250 millivolt peak to peak voltage signal between center tap 113 on the secondary winding 112 and terminals 116 and 116'. The use of the transformer 106 also provides isolation for the secondary unit B which may be located remotely from the primary unit A.

THE SECONDARY UNIT

Figure 3:
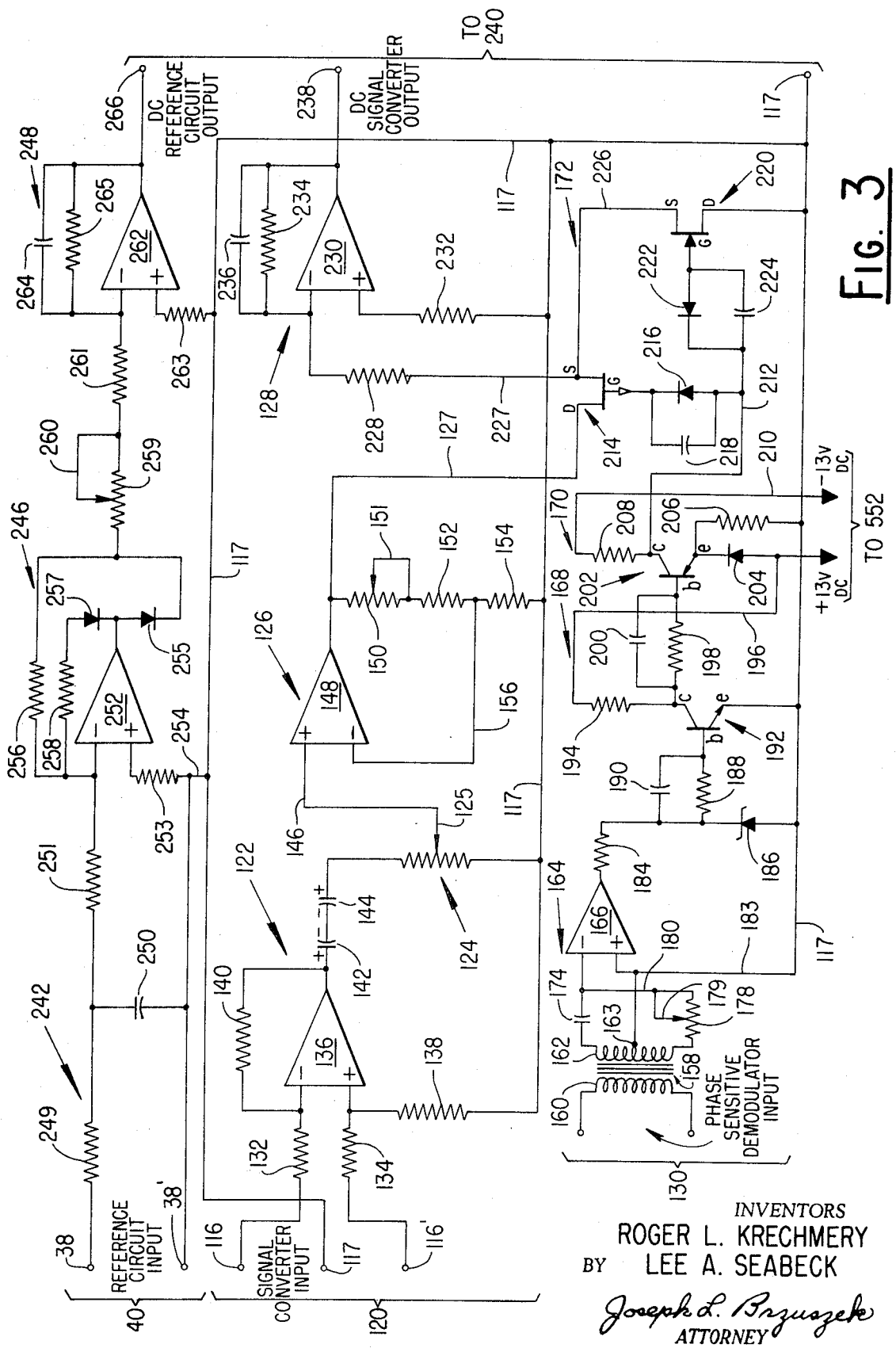
FIGS. 3–5 inclusive form a conjoint schematic diagram of the secondary circuits in the flowmeter.

Referring now to FIG. 3, the signal converter amplifier 120, the phase sensitive demodulator 130 and the reference voltage circuit 40, included in the secondary unit B of FIG. 1, are schematically illustrated. The signal converter amplifier 120 includes a first stage of differential amplification 122 coupled to a second stage of differential amplification 126 through a span adjustment potentiometer 124; an averaging amplifier circuit 128 is coupled from the second stage of differential amplification 126 through the phase sensitive demodulator 130 in order to provide a D.C. output signal at terminal 238 which is proportional to the flow signal coupled from the primary unit A.

The first stage of differential amplification 122 includes an operational amplifier 136 having its negative input terminal connected through an input resistor 132 from the secondary terminal 116 of transformer 106. The transformer secondary terminal 116' is connected to an input resistor 134 which is in turn connected to the positive input terminal of operational amplifier 136. This positive input terminal is also connected through a bias resistor 138 to the conductor 117 from the center tap 113 of transformer 106 and serves as the secondary reference ground for the entire secondary unit B. The output terminal of operational amplifier 136 is connected through a feedback resistor 140 to its negative input terminal. A polarized capacitor 142 has its positive terminal connected to the output terminal of operational amplifier 136, and its negative terminal is connected to the negative terminal of a second polarized capacitor 144. The capacitor 144 has its positive terminal connected in series with the span adjustment potentiometer 124 which is referenced to conductor 117. The movable contact arm 125 of the span adjustment potentiometer 124 is connected through a conductor 146 to the positive input terminal of an operational amplifier 148 which is included in the second stage of differential amplification 126. The output terminal of operational amplifier 148 is connected through a voltage dividing network including a calibrated adjustment potentiometer 150 in series with a resistor 152 which is also in series with a resistor 154. The junction between resistor 152 and 154 is connected through a conductor 156 to the negative input terminal of operational amplifier 148. The movable contact arm 151 of the calibrated adjustment potentiometer 150 is connected to the junction between potentiometer 150 and resistor 152. The output terminal of operational amplifier 148 is connected through conductor 127 into a series-shunt chopper circuit 172 which forms a part of the phase sensitive demodulator 130.

The phase sensitive demodulator 130 also includes a phase shifting network 164, a clamper amplifier 168 and an inverter amplifier 170 which in combination are used to gate the series-shunt chopper circuit 172. The supply voltage for the flowmeter system is coupled from the primary winding 160 of a transformer 158 to a secondary winding 162 having a center tap at 163. The phase shifting network 164 includes a capacitor 174 connected between one terminal of the secondary winding 162 and the negative input terminal of operational amplifier 166. The remaining terminal of secondary winding 162 is connected through potentiometer 178, having a movable contact arm 179 connected to its remaining terminal, the junction of these terminals also being connected to the negative input terminal of operational amplifier 166 through conductor 180. A center tap of the secondary winding 162 at point 163 is connected to the positive input terminal of the operational amplifier 166, and their junction is connected through conductor 183 to the secondary reference ground conductor 117. The effect of adjusting contact arm 179 is to shift the phase of the A.C. voltage signal introduced in the secondary winding 162 and applied to the input terminals of the operational amplifier 166. This provides that the output voltage of the operational amplifier 166 is exactly in phase with respect to the flow signal voltage in its A.C. form at the output terminal of operational amplifier 148.

The output terminal of operational amplifier 166 is connected through a resistor 184, through a resistor 188 and a capacitor 190, connected in parallel, to the base of an NPN transistor 192. The junction between resistor 184 and the parallel combination of resistor 188 and capacitor 190 is connected to the cathode of a Zener diode 186 having its anode connected to the reference ground conductor 117. The emitter of transistor 192 is connected to conductor 117, and its collector is connected through a resistor 194, through a conductor 196 to a positive D.C. voltage supplied by the secondary unit power supply 552 in FIG. 1. The circuit described above is included in the clamper amplifier 168 which is used to clamp the output voltage from operational amplifier 166 to a useful level as well as providing an increased switching speed between low and high voltage levels. This latter effect is enhanced by the use of the parallel combination of resistor 188 with capacitor 190.

The output signal from the clamper amplifier 168 is connected from the collector of transistor 192 through a resistor 198, in parallel with a capacitor 200, to the base of a PNP transistor 202. The emitter of transistor 202 is connected to the cathode of a diode 204 which has its anode connected to the positive D.C. voltage supplied to the collector of transistor 192. The emitter of transistor 202 is also connected through a resistor 206 to the reference ground conductor 117. The collector of transistor 202 is connected through a resistor 208 to a negative voltage source included in the secondary unit power supply 552. The circuit thus described is included in the inverter amplifier 170 and provides a square wave output signal at the collector terminal of transistor 202. This output signal has a frequency equal to the frequency of the amplified flow signal at the output terminal of operational amplifier 148 and is directly in phase therewith.

The collector of transistor 202 is connected by a conductor 212 to the input of the series-shunt chopper circuit 172. The series-shunt chopper circuit 172 includes a P-channel FET 214 having its gate terminal connected to the cathode of a diode 216 which has its anode connected to conductor 212. A capacitor 218 is connected in parallel across diode 216. The drain terminal of FET 214 is connected to the output of operational amplifier 148 by conductor 127, and its source terminal is connected to conductor 227 which forms one of the inputs to the averaging amplifier circuit 128. An N-channel FET 220 is connected so as to be in shunt between conductor 227 and the reference ground conductor 117. The source terminal of FET 220 is connected through conductor 226 to the source terminal of FET 214, and the drain terminal of FET 220 is connected directly to conductor 117. The gate terminal of FET 220 is connected to the anode of a diode 222 which has its cathode connected to a conductor 212, and a capacitor 224 is connected in parallel with diode 222. The effect of the series-shunt chopper circuit in conjunction with the symmetrical square wave voltage signal at the collector of transistor 202 provides a relatively low series resistance between the drain-source terminals FET 214. This arrangement passes negative half cycles of the flow signal on conductor 127 to conductor 227 and into the negative input of the averaging amplifier circuit 128 while simultaneously presenting a relatively large shunt resistance between the drain-source terminals of FET 220 to effectively act as an open circuit during negative half cycles of the flow signal. During positive half cycles of the flow signal, the drain-source resistance of FET 214 is relatively high so as to present substantially an open circuit between conductors 127 and 227. At the same time, the drain-source resistance of FET 220 is relatively low in order to provide a shunt path to the reference ground conductor 117 for substantially eliminating any of the positive half cycles of the flow signal from being conducted to the input of the averaging amplifier circuit 128. The series-shunt chopper circuit operating in this fashion thus provides negative half cycles of the flow signal to the input of the averaging amplifier circuit 128, and its operation may be likened to that of a half-wave rectifier with the following important distinction. The overall operation of the phase sensitive demodulator 130 rejects any quadrature signal component present at the output terminal of operational amplifier 148 which has not been rejected by the preceding circuitry or which has been introduced during the previous functional operations on the flow signal.

The averaging amplifier circuit 128 includes an operational amplifier 230 having its negative input terminal connected to an input resistor 228 which is also connected to conductor 227. The positive input terminal of operational amplifier 230 is connected to a bias resistor 232 connected to the reference ground conductor 117. A resistor 234 is connected in feedback between the output terminal of operational amplifier 230 and its negative input terminal, and a capacitor 236 is connected in parallel with resistor 234 in order to provide the averaging operation to the negative half cycles of the flow signal from conductor 227. The output of operational amplifier 230 at terminal 238 provides one of the inputs to the voltage to frequency converter 240 in FIGS. 1 and 4.

Figure 6:
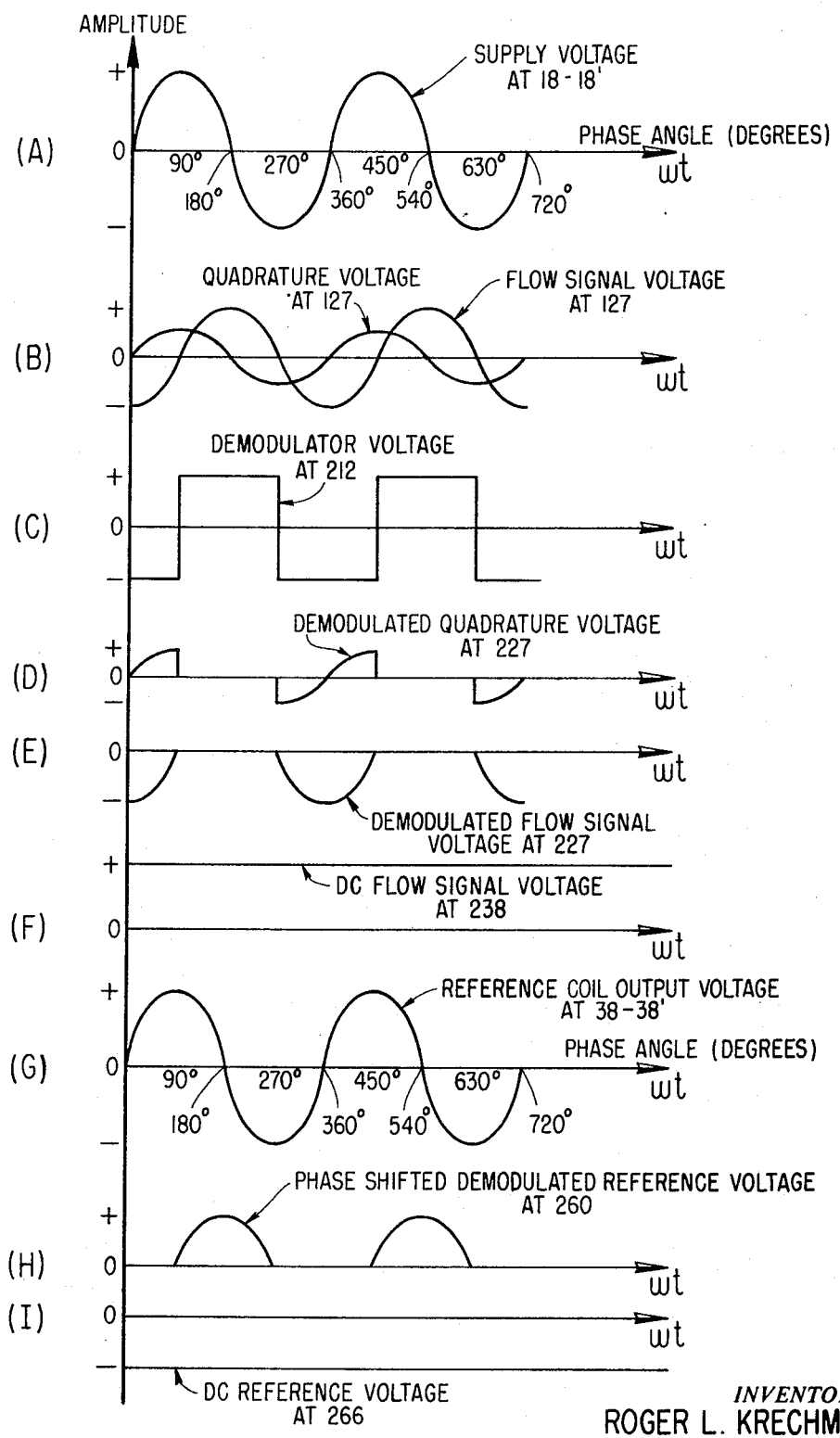
FIG. 6 is a view of wave forms representing various operating characteristics of the circuits in FIGS. 2 and 3.

The various operating characteristics of the flowmeter circuits described above, including the signal converting amplifier 120 and the phase sensitive demodulator 130 may be more thoroughly understood by reference to FIG. 6 (A)-(F). FIG. 6 is intended to show the relative phase angle and polarity with respect to various wave forms in the flowmeter system but is not intended to show the relative amplitude of these wave forms. FIG. 6(A) shows two cycles of the A.C. sinusoidally alternating supply voltage at the input terminals 18–18' of FIG. 1. This voltage wave form may also be considered to represent the voltage on the primary winding 160 of transformer 158 for the phase sensitive demodulator 130 as well as the voltage for the exciter coils 16–16' in the flow head assembly 10. The abscissa ($\omega t$) represents the phase angle in degrees and is graduated in increments of 90°.

Referring now to FIG. 6(B), the flow signal voltage wave form on conductor 127 is shown to be shifted 90 electrical degrees lagging with respect to the instantaneous phase angle of the wave form in FIG. 6(A). A phase quadrature voltage component on the conductor 127 is shown to have a phase angle identical to the phase angle of the wave form in FIG. 6(A). This quadrature voltage on conductor 127 may be considered to have a relatively small instantaneous amplitude because of the effect of the quadrature-balancing elements in the flow head assembly 10 when they are properly adjusted. A point by point summation of the flow signal voltage and the quadrature signal voltage in FIG. 6(B) would provide a representation of the actual wave form on conductor 127, but for purposes of illustrating the effect of the phase sensitive demodulator 130, the flow signal voltage and the quadrature voltage may be considered independently as illustrated.

FIG. 6(C) shows the demodulator voltage on conductor 212 which drives the series-shunt chopper circuit 172. The action of the series-shunt circuit 172, by changing the resistance of FET's 214 and 220, demodulates the flow signal voltage at 127, and this results in the negative half cycles of flow signal voltage on conductor 227 as shown in FIG. 6(E). The component of quadrature voltage on conductor 127, between the phase interim of 90°–270° and between 450°–630°, as well as the positive flow signal voltage on conductor 127 between these phase interims is completely eliminated. The components of demodulated quadrature voltage on conductor 227, which remain after the action of the phase sensitive demodulator 130, have a negative component below the abscissa which is equal to a positive component above the abscissa as shown in FIG. 6(D). The average value of the demodulated quadrature voltage on conductor 227 is, therefore, equal to zero; whereas, the demodulated flow signal voltage on conductor 227 is shown to have a negative value. After the wave form shown in FIG. 6(E) is processed through the averaging amplifier circuit 128, the wave form shown in FIG. 6(F) is the result, and this wave form is representative of the D.C. flow signal voltage at terminal 238. The voltage wave form shown in FIG. 6(F) is variable over positive values and is proportional to the A.C. flow signal voltage.

An alternative arrangement for the phase sensitive demodulator 130 provides a direct connection from the output terminal of operational amplifier 166 to the conductor 212, driving the series-shunt chopper circuit 172, and thus eliminating resistor 184, clamper amplifier 168 and inverter amplifier 170. The amplifiers 168, 170 serve mainly to speed up the switching from negative to positive values, and vice versa, of the voltage on conductor 212. These amplifiers may be eliminated with the proviso that the operational amplifier 166 is of sufficiently high gain and is rapid enough in operation to provide a square wave voltage at its output terminal which will properly drive the series-shunt chopper circuit 172. The circuit thus described, including signal converter amplifier 120 and phase sensitive demodulator 130 in its modified form, will thus operate in substantially the same fashion as described above in order to provide a D.C. signal voltage at terminal 238 which is substantially free of any quadrature component.

The reference voltage circuit 40, also illustrated in FIG. 3, includes a low pass filter 242, a precision half wave rectifier circuit 246 and an averaging amplifier circuit 248. The low pass filter 242 includes a resistor 249 connected in series to terminal 38 and a capacitor 250 connected in shunt with respect to the other terminal of resistor 249 and the reference coil terminal 38'. The output voltage across capacitor 250 may be written as a function of the input voltage at terminals 38, 38' according to equation (1):

$$V_{C250} = E_{38-38'} / (1 + j2\pi f R_{249} C_{250}) \qquad (1)$$

Where:

$V_{C250}$ = the voltage across capacitor 250

$E_{38-38'}$ = the reference coil output voltage at terminals 38–38'

$j = \sqrt{-1}$ = the complex operator $f$ = the reference coil supply frequency in cycles per second $R_{249}$ = the value of resistor 249 in ohms, and $C_{250}$ = the capacitance of capacitor 250 in farads If the second term in the denominator of equation (1) is large with respect to 1, the first term in the denominator, this equation can be written as equation (2).

$$V_{C250} = E_{38-38'} / (j2\pi f R_{249} C_{250}) \qquad (2)$$

Equation (2) shows that for constant values of resistance and capacitance, the voltage across capacitor 250 varies directly proportional to the reference coil output voltage and inversely proportional with respect to the frequency of the reference coil output voltage. This effect is important since the ultimate purpose of the reference voltage in the flowmeter system is to provide a comparison voltage which will compensate for supply voltage changes in peak amplitude and frequency. As will be subsequently described, the provision of the low pass filter 242 at the input to the reference voltage circuit 40 fully compensates for these changes in the supply voltage in order to provide an accurate measurement of fluid flow.

The common junction between resistor 249 and capacitor 250 is connected to a resistor 251 which is in turn connected to the negative input terminal of an operational amplifier 252 included within the precision half wave rectifier circuit 246. The positive input terminal of operational amplifier 252 is connected through a bias resistor 253 through a conductor 254 to the ground reference conductor 117. Conductor 254 is also connected to the junction between terminal 38' and capacitor 250. The rectifier circuit 246 also includes two feedback paths between the output terminal of operational amplifier 252 and its negative input terminal. The first feedback circuit includes a resistor 258 connected to the anode of a diode 257 having its cathode connected to the output terminal of operational amplifier 252. This cathode is also connected to the anode of a diode 255 having its cathode connected to a resistor 256 which completes the second feedback circuit. The junction common to the cathode of diode 255 and resistor 256 is connected through a compensator potentiometer 259 having a movable contact arm 260 connected to one of its terminals and a resistor 261 which forms an input to the negative input terminal of an operational amplifier 262 included within the averaging amplifier circuit 248. The positive input terminal of operational amplifier 262 is connected through a bias resistor 263 to the reference ground conductor 117. A feedback resistor 265 is connected in parallel with a capacitor 264 between the output terminal of the operational amplifier 262 and its negative input terminal, and output terminal 266 forms a second input to the voltage to frequency converter 240 shown in FIGS. 1 and 4. The compensator potentiometer 259 is adjustable to provide adjustment of the D.C. reference voltage output at terminal 266. Without this adjustment, capacitor 250 would be required to have a very close tolerance. Since temperature stability is desired in the reference voltage circuit 40, capacitor 250 is chosen to be temperature stable.

Temperature stability is accomplished for the remainder of the reference voltage circuit 40 by energizing operational amplifier 252 within the reference voltage circuit 40 from the same source of supply voltage as used for operational amplifier 148 in the signal converter amplifier 120. Operational amplifiers 262 and 230 are similarly energized. Temperature stability and the elimination of drift problems in the D.C. output voltages at terminals 266 and 238 are further enhanced by substantially matching the averaging amplifier circuits 248 and 128. This matching includes providing capacitors 264 and 236 which are equal in value and doing the same for resistors 265 and 234.

Referring again to FIG. 6, and, in particular the wave forms shown in (G)-(I), FIG. 6(G) shows two cycles of the sinusoidal A.C. voltage at terminals 38, 38'. It should be noted that the reference coil output voltage is in phase with the supply voltage shown in wave form (A) of this figure. FIG. 6(H) shows the wave form for the demodulated reference voltage at the movable contact arm 260, and it is shown shifted an amount equal to approximately 90 electrical degrees phase lagging with respect to the instantaneous phase of the wave form shown in FIG. 6(G). This phase shift is due to the relative magnitude of the parameters for resistor 249 and capacitor 250 and is further accounted for by the inclusion of the complex operator $j$ in equations (1) and (2). The reference voltage circuit 40, unlike the phase sensitive demodulator 130, is not phase sensitive. The reference voltage circuit 40 is, however, sensitive to the magnitude of the magnetic flux field generated within the flow conduit 12. It is also sensitive to the frequency of this magnetic flux field since both are inter-dependent on the supply voltage and thus have a direct effect on the flow signal induced in the field to be measured. The wave form shown in FIG. 6(I) represents the negative polarity D.C. reference voltage at terminal 266 after averaging and inversion by passing the wave form of FIG. 6(H) through the averaging amplifier circuit 248. The level of the D.C. reference voltage varies over negative values corresponding to the amplitude and frequency changes of the supply voltage. The level of this reference voltage may be adjusted by adjusting the contact arm 260 of the compensator potentiometer 259 in order to modify the amplitude of the input signal to operational amplifier 262.

The D.C. reference voltage at terminal 266 is adjusted to be substantially equal to the D.C. flow signal voltage at terminal 238 when this latter voltage is at a positive value corresponding to the maximum rate of flow. The span adjustment potentiometer 124 in the signal converter amplifier 120 provides adjustment for full scale deflection of the flow signal voltage to adjust the sensitivity of the flowmeter. The calibrated adjustment potentiometer 150, also located within the signal converter amplifier 120, provides added flexibility for calibration purposes.

VOLTAGE TO FREQUENCY CONVERTER

Figure 4:
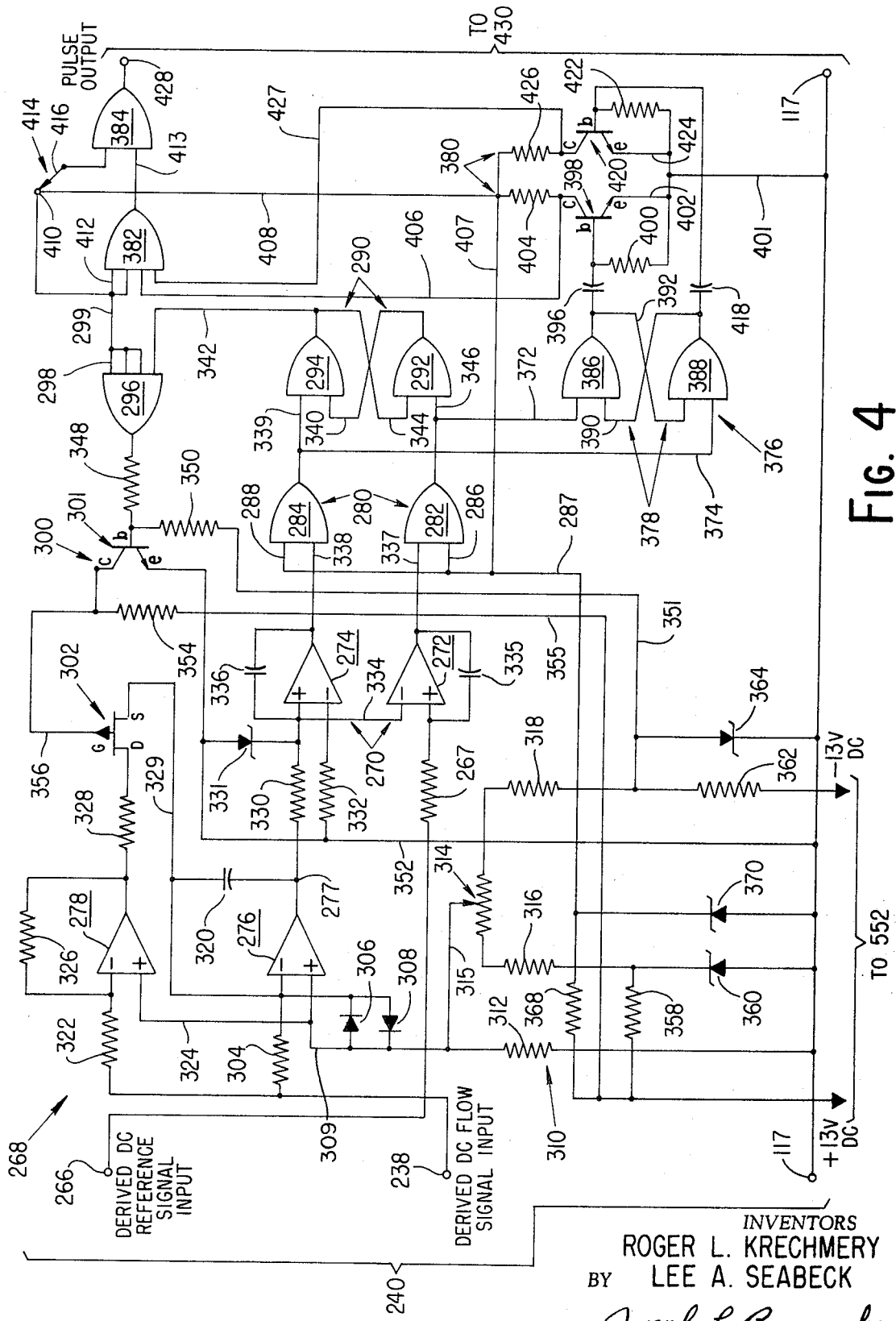

Referring now to FIG. 4, the voltage to frequency converter 240 is connected at terminal 238 to the D.C. flow signal voltage converter amplifier 120. It is also connected at terminal 266 to the D.C. reference signal voltage from the reference voltage circuit 40. The voltage to frequency converter 240 includes a dual integrator ratio circuit 268, a voltage divider and regulator network 310 and a frequency doubling circuit 376. The voltage to frequency converter 240 provides a variable duty cycle pulse output at an output terminal 428 which varies proportional to the ratio of the D.C. flow signal voltage with respect to the D.C. reference signal voltage.

The dual integrator ratio circuit 268 includes a comparator circuit 270, a dual inverter stage 280, a flip-flop stage 290, an inverter amplifier 296, a buffer gate amplifier 300, and a pair of operational amplifiers 276, 278 arranged for dual integration. The comparator circuit 270 includes a pair of operational comparators 272, 274, which here take the form of operational amplifiers. The operational amplifier 272 has its positive input terminal connected to the D.C. reference voltage terminal 266 through a resistor 267. The operational amplifier 272 provides a reference comparison output pulse, and the operational amplifier 274 provides a signal comparison output pulse as will be described subsequently.

The dual inverter stage 280 includes a pair of logic amplifiers 282, 284 of the NAND type, and each logic amplifier has at least two input terminals and an output terminal. One of the input terminals of logic amplifier 282 is connected to the output terminal of operational amplifier 272 by conductor 337, and one of the input terminals of logic amplifier 284 is connected to the output terminal of operational amplifier 274 by conductor 338. The remaining input terminals of logic amplifiers 282, 284 are connected in common by conductors 286 and 288, and their junction is connected by conductor 287 to a positive source of voltage in order to maintain one of the inputs of each of the logic amplifiers at a fixed voltage level. The flip-flop stage 290 includes a second pair of NAND logic amplifiers 292, 294 each having two input terminals and an output terminal. One of the inputs of logic amplifier 292 is connected to the output terminal of logic amplifier 282 by conductor 346, and its other input terminal is cross-coupled to the output of logic amplifier 294 by conductor 344. Similarly, logic amplifier 294 has one of its input terminals connected to the output terminal of logic amplifier 284 by conductor 339, and its other input terminal is cross-coupled to the output terminal of logic amplifier 292 by conductor 340. Logic amplifier 294 provides the set action of the flip-flop stage 290, and logic amplifier 292 provides the reset action as will be described subsequently.

The output terminal of logic amplifier 294 is connected to one of the inputs of the inverter amplifier 296 by conductor 342. The inverter amplifier 296 is of the NAND type and has its remaining input terminals 298 connected in common through a conductor 299 to a positive source of voltage in order to maintain them at a fixed voltage level. The output terminal of inverter amplifier 296 is connected through a resistor 348 to the input of a buffer gate amplifier 300. The buffer gate amplifier 300 includes an NPN transistor 301 with the input connection being made to its base terminal. The base of transistor 301 is also connected to a resistor 350 which is in turn connected to a negative D.C. source of voltage by way of conductor 351. The emitter of transistor 301 is connected to the secondary reference ground conductor 117 through conductor 352. The collector terminal of transistor 301 is connected to a resistor 354 which is in turn connected to one of the positive D.C. output voltages from the secondary unit power supply 552 of FIG. 1. The collector of transistor 301 is also connected to the gate terminal of a P-channel FET 302 which has its drain-source terminals connected to operate as a switch to control the operation of the dual integrator ratio circuit 268.

The D.C. flow signal voltage at terminal 238 is conducted through a resistor 304 to the negative input terminal of operational amplifier 276 and through a resistor 322 to the negative input terminal of operational amplifier 278. A dual integrated circuit amplifier is used for operational amplifiers 276, 278 in order to reduce the offset voltage and current of these amplifiers to a minimum. As these amplifiers 276, 278 are matched with respect to offset voltage and current, it is not necessary to consider the difference between amplifiers, but it is necessary to bias their initial offsets to zero. The offset bias is accomplished by connecting the positive input terminal of operational amplifier 276 to the positive input terminal of operational amplifier 278 by a conductor 324. The provision of a pair of oppositely-poled diodes 306, 308 connected in parallel between the positive and negative input terminals of amplifier 276 is also made, and amplifier 276 has its positive input terminal connected through conductor 309 to voltage divider network 310. Voltage divider network 310 includes a resistor 312 connected between conductor 309 and reference ground conductor 117 and an offset potentiometer 314 with its movable contact arm 315 connected to the junction between conductor 309 and resistor 312. A resistor 316 is connected between a positive D.C. potential and the potentiometer 314, and a resistor 318 is connected between a negative D.C. potential, having the same magnitude as the positive potential, and the potentiometer 314. This is provided so that the movable contact arm 315 can be adjusted over a positive to negative range of potentials in order to bias the offset voltages of operational amplifiers 276, 278. The operational amplifier 276 is provided with a capacitor 320 connected between its output terminal and its negative input terminal which, in conjunction with resistor 304, provides an output signal that is an integral function of its input signal.

Operational amplifier 278 has a resistor 326 connected between its output terminal and its negative input terminal which, in conjunction with resistor 322, provides a gain of two. With this gain, the D.C. flow signal voltage at the output terminal of operational amplifier 278 is twice that of its input voltage. A resistor 328 is connected between the output terminal of amplifier 278 and the drain terminal of FET 302, and the source terminal of FET 302 is connected to the negative input terminal of operational amplifier 276 through conductor 329. When the drain-source resistance of FET 302 is switched to its low state, the output signal of operational amplifier 278 is supplied to the negative input terminal of operational amplifier 276. When the drain-source resistance of FET 302 is otherwise in its high resistance state, the amplified flow signal voltage from operational amplifier 278 is not applied to the negative input terminal of operational amplifier 276. The output terminal of operational amplifier 276 is connected through conductor 277 and a resistor 330 into the positive input terminal of operational amplifier 274. The positive input terminal of operational amplifier 274 is also connected by a conductor 334 to the negative input terminal of operational amplifier 272, as well as being connected to the cathode of a Zener diode 331. The Zener diode 331 has its anode connected to conductor 352 which is connected to reference ground conductor 117. The negative input terminal of operational amplifier 274 is connected through a resistor 332 to conductor 352. A capacitor 336 is connected in feedback between the output terminal of operational amplifier 274 and its positive input terminal, and this capacitor 336 is used to provide hysteresis in order to enhance the switching speed of operational amplifier 274 between its off and on states. A similar capacitor 335 is connected between the output terminal and positive input terminal of operational amplifier 272 in order to provide this same effect in its switching operation.

The voltage divider and regulator network 310 also includes a resistor 358 connected between the positive D.C. voltage from the secondary unit power supply 552 and resistor 316. The junction of resistor 358 and resistor 316 is connected to the cathode of a Zener diode 360 which has its anode connected to the reference ground conductor 117. A resistor 362 is connected between the negative voltage from the secondary unit power supply 552 and resistor 318. The anode of a Zener diode 364 is connected to the junction between resistors 362 and 318 and has its cathode connected to the reference ground conductor 117. The Zener diodes 360, 364 are identical in order to provide temperature compensation to the circuit including resistor 316, offset potentiometer 314 and resistor 318 so as to provide relatively drift-free operation of the offset balance. A resistor 368 is connected between the positive voltage supplied from secondary unit power supply 552 and conductor 287. Conductor 287 is connected to the cathode of a Zener diode 370 which has its anode connected to the reference ground conductor 117. This last-mentioned circuit connection provides a regulated D.C. voltage for all of the logic amplifiers in the voltage to frequency converter 240 requiring same.

Still referring to FIG. 4, the frequency doubling circuit 376 includes a flip-flop stage 378 having its outputs connected through a summing amplifier 380 into a logic amplifier 382 and through an inverter logic amplifier 384 to the pulse output terminal 428. The flip-flop stage 378 includes a logic amplifier 386 having one of its input terminals connected through conductor 372 to the output terminal of logic amplifier 282. The other input terminal of logic amplifier 386 is connected to the output terminal of logic amplifier 388 through conductor 390. The logic amplifier 388 has one of its input terminals connected to the output terminal of logic amplifier 284 by conductor 374 and has its other input terminal connected to the output terminal of logic amplifier 386 by conductor 392. Both logic amplifiers 386, 388 are of the NAND type. The provision of the flip-flop stage 378 eliminates any noise on the output signal from the dual inverter stage 280 and provides a pair of time related output pulses from the output terminals of logic amplifiers 386, 388. Upon further processing of these output pulses through the frequency doubling circuit 376, a pulse output at terminal 428 is obtained which has a frequency twice that of the frequency of the output wave form of operational amplifier 276 during one full period of integration.

The summing amplifier 380 includes an NPN transistor 398 having its base connected to the output terminal of logic amplifier 386 through a capacitor 396 and also having its base terminal connected through resistor 400 and through conductor 401 to the ground reference conductor 117. The combination of capacitor 396 and resistor 400 provides a differentiating action on the voltage output from logic amplifier 386 in order to provide a spike of voltage to the base terminal of transistor 398. This spike renders transistor 398 conductive for a short instant of time relative to the minimum period of pulses at terminal 428. Transistor 398 has its emitter terminal connected by conductor 402 to conductor 401 and has its collector terminal connected through a resistor 404 and through a conductor 407 to a source of D.C. operating voltage. The collector terminal of transistor 398 is also connected by conductor 406 to one of the input terminals of logic amplifier 382. A similar NPN transistor 420 has its base terminal coupled to the output terminal of logic amplifier 388 through a capacitor 418, and a resistor 422 is connected to the base terminal and conductor 401 in order to provide a similar differentiating action on the voltage output of logic amplifier 388. The emitter of transistor 420 is grounded by conductor 424, and the collector is connected to a resistor 426 which is in turn connected to conductor 407. The collector of transistor 420 forms a second input to logic amplifier 382 by way of conductor 427. The remaining input terminals of logic amplifier 382, designated at 412, are connected to a fixed terminal 410 of a pulse inhibit switch 414. The fixed terminal 410 is connected through a conductor 408 to a fixed level of D.C. voltage on which it is dependent for its operation as a NAND type logic amplifier. The output terminal of logic amplifier 382 is connected by conductor 413 to one of the input terminals of the inverter logic amplifier 384, and the other input terminal of logic amplifier 384 is connected to the movable switch arm 416 of the pulse inhibit switch 414. The movable contact arm 416 electrically contacts the fixed contact 410 during normal operation, and it is switched to its electrically open position in order to eliminate the pulse output at terminal 428. This terminal is directly connected to the output terminal of inverter logic amplifier 384.

OPERATION OF THE VOLTAGE TO FREQUENCY CONVERTER

The operation of the voltage to frequency converter 240 will be described with reference to the wave forms in FIG. 7(A)-(G) showing several wave forms representative of various points in the circuit of FIG. 4. The wave forms shown in FIG. 7 are intended to show the relative time relationships between the triangular wave forms of FIG. 7(A) with respect to the pulses in FIG. 7(B)-(G).

The first triangular wave form, designated (1) in FIG. 7(A), occupies the time period $T_1$ along the time axis. This wave form, along with the subsequent triangular wave forms, designated (2), (3), are present at the output terminal 277 of the operational amplifier 276. This corresponds to a particular value of D.C. flow signal voltage input on terminal 238 and D.C. reference signal voltage input on terminal 266. The triangular wave form in FIG. 7(A), designated (2) and occupying the time period $T_2$, is representative of a greater flow signal voltage input at terminal 238 relative to the value of flow signal voltage input for the triangular wave form designated (1). Both the triangular wave forms (1) and (2) represent the situation where the reference signal voltage at terminal 266 is the same value, $-E_2$, and the effect of the change in amplitude of the flow signal voltage from a lower value in (1) to a higher value in (2) is reflected by the change from a greater time period $T_1$ to a smaller time period $T_2$ respectively. The triangular wave form designated (3), occupying the time period $T_3$, is illustrative of the situation where both the flow signal voltage and the reference signal voltage have decreased in value by a certain amount, but the ratio of the reference signal voltage to the flow signal voltage has remained constant. This is indicative that the rate of flow has not changed over time periods $T_2$ and $T_3$. Notwithstanding the change in the reference voltage from $-E_2$ for triangular wave form (2) to $-E_1$ for triangular wave form (3), the period $T_2$ is equal in value to the period $T_3$. In a similar fashion, if the reference signal voltage increased to a greater negative value and the rate of fluid flow remained unchanged, the flow signal voltage would increase to a higher positive value. The ratio of the reference signal voltage to the flow signal voltage would remain unchanged resulting in a triangular wave form of the same time period of either $T_2$ or $T_3$. In this way, the period of the triangular wave forms at the output of operational amplifier 276 are directly proportional to the ratio of reference signal voltage with respect to flow signal voltage while being insensitive to variations occurring during a constant rate of fluid flow.

The operation of amplifier 276 in conjunction with capacitor 320 and input resistor 304 may be defined as set forth in equation (3).

$$e_o = \frac{1}{RC} \int_o^t e_{in} dt \qquad (3)$$

Where:
$e_o$ = the output voltage of operational amplifier 276
$R$ = the value of resistor 304 in ohms
$C$ = the value of capacitor 320 in farads, and
$e_{in} = E_{fs}$ = the D.C. flow signal voltage at terminal 238.

Now, referring specifically to the triangular wave form (1) occurring in the time period $T_1$ in FIG. 7(A), equation (3) has two forms, the first of which defines the first half of the wave form occurring in the time interval from zero to $t_1$ and the second form for the time interval $t_1$ to $t_2$.

Equation (4) defines the output signal $e_o$ over the first time interval, and equation (5) is for the second time interval.

0010

$$e_o = \frac{-1}{RC} \int_o^t E_{fs} dt \text{ from } o \leq t \leq t_1 \qquad (4)$$

$$e_o = \frac{-1}{RC} \int_{t_1}^{t_2} (E_{fs} - 2E_{fs}) dt - E_2 \text{ from } t_1 \leq t \leq t_2 \qquad (5)$$

Where:
$-E_2$ is the D.C. reference signal voltage at terminal 266

Performing the integration on the integrand in equation (4) results in equation (6) which defines $e_o$ for the first time interim, from zero to $t_1$.

$$e_o = (-E_{fs}t)/RC \text{ from } o \leq t \leq t_1 \qquad (6)$$

Because of the action of the logic circuitry within the dual integrator ratio circuit 268, as will be described subsequently, the maximum negative value of the negatively sloping portion of the triangular wave form (1) will be $-E_2$, the D.C. reference voltage signal. At time $t = t_1$ in equation (6), $e_o = -E_2$. Substituting the above and solving for $t_1$ results in equation (7).

$$t_1 = E_2 RC/E_{fs} \qquad (7)$$

Equation (7) also represents an expression for one half the time period $T_1$ of the triangular wave form (1) since the time interval from time equal zero to time equals $t_1$ is one half of the time period of the triangular wave form, assuming that the flow signal voltage and reference signal voltage have not changed over this period of operation.

Performing the integration on the integrand of equation (5), equation (8) is obtained, and this equation is further modified by substituting the value for time $t_1$ at the lower limit of integration as defined by equation (7) to give equation (9).

$$e_o = (E_{fs}t)/(RC) (-E_{fs}t_1 E_2)/RC \qquad (8)$$

$$e_o = E_{fs}t - 2E_2)/RC \text{ from } t_1 \leq t \leq t_2 \qquad (9)$$

Equation (9) defines that portion of the triangular wave form (1) between the time interval from $t_1$ to $t_2$ corresponding to the second half period of time period $T_1$. At time $t = t_2$, $e_o = 0$ and solving for $t_2$ in equation (9) gives equation (10).

$$t_2 = 2E_2 RC/E_{fs} \qquad (10)$$

Equation (10) also provides an expression for the full time period $T_1$ since time is cumulative along the abscissa, and $t_2$ is a measure of time from time equals zero to time is equal to $t_2$. The frequency in cycles per second of triangular wave form (1) is the reciprocal of $T_1$ as presented in equation (11).

$$f_1 = 1/T_1 = E_{fs}/2E_2 RC \qquad (11)$$

it should be understood that the above analytical relationships are also true for the triangular wave forms (2), (3) with the exception that in the triangular wave form (2), the value of $E_{fs}$ is greater, corresponding to a greater fluid flow rate. The value for the reference signal voltage is diminished for triangular wave form (3), so $-E_1$ is substituted for $-E_2$ in all of the above relationships. It should also be recognized that the ratio of reference signal voltage with respect to flow signal voltage is the same for triangular wave form (2) as it is for triangular wave form (3). As was previously explained, the time periods $T_2$, $T_3$ are equal even though the shape of triangular wave form (2) is different from the shape of triangular wave form (3) corresponding to a constant rate of fluid flow over these time intervals during a variation in supply voltage to the flowmeter system.

The operation of the dual integrator ratio circuit 268 is further described with reference to FIG. 7(B)–(F) which show wave forms representative of various points in the logic circuitry. FIG. 7(B) shows the output pulses on conductor 338 which are at the output terminal of operational amplifier 274. An output pulse of relatively brief duration occurs on conductor 338 each time that the triangular wave form from the output terminal of operational amplifier 276 reaches zero volts. This condition is reached at the termination of the positively sloping leg at the close of the second half period of each triangular wave form. The biasing arrangement, including resistor 332 connected through conductor 352 to the reference ground conductor 117, dictates that the output of operational amplifier 274 is substantially zero when the signal input to its positive input terminal is negative. A positive output pulse is provided at the time that the signal input to the positive input terminal reaches zero. The positive output pulses from operational amplifier 274 thus occur at time equal to zero, $t_2$, $t_4$, $t_6$, and these output pulses are used to change the state of the NAND logic amplifier 284 from its high state to its low state at each of these particular instants of time. FIG. 7(C) shows the output pulses at the output terminal of operational amplifier 272. An output pulse of relatively short duration is provided by operational amplifier 272 each time the triangular wave form reaches a negative magnitude of voltage which is equal to the magnitude of reference signal voltage applied to the positive input terminal of operational amplifier 272. Each time the magnitude of the triangular wave form reaches its apex, during the first half period of operation, the negative input terminal of operational amplifier 272 becomes more negative than its positive input terminal. A voltage pulse is thus present at its output terminal at time equal to $t_1$, $t_3$, $t_5$. The conductor 337, connected to the input of the NAND logic amplifier 282 changes the state of the voltage at its output terminal from a high to low voltage state for each of the above designated instants of time. The purpose of amplifiers 282, 284 is to provide inversion of the output signals on conductors 337, 338, respectively, in order to provide the proper input signals for the flip-flop stage 290. The purpose of the flip-flop stage 290 blocks out any noise on the output of the inverter stage 280 so that the output state of the flip-flop will respond only to the pulse output of the comparator stage 270.

Figure 7:
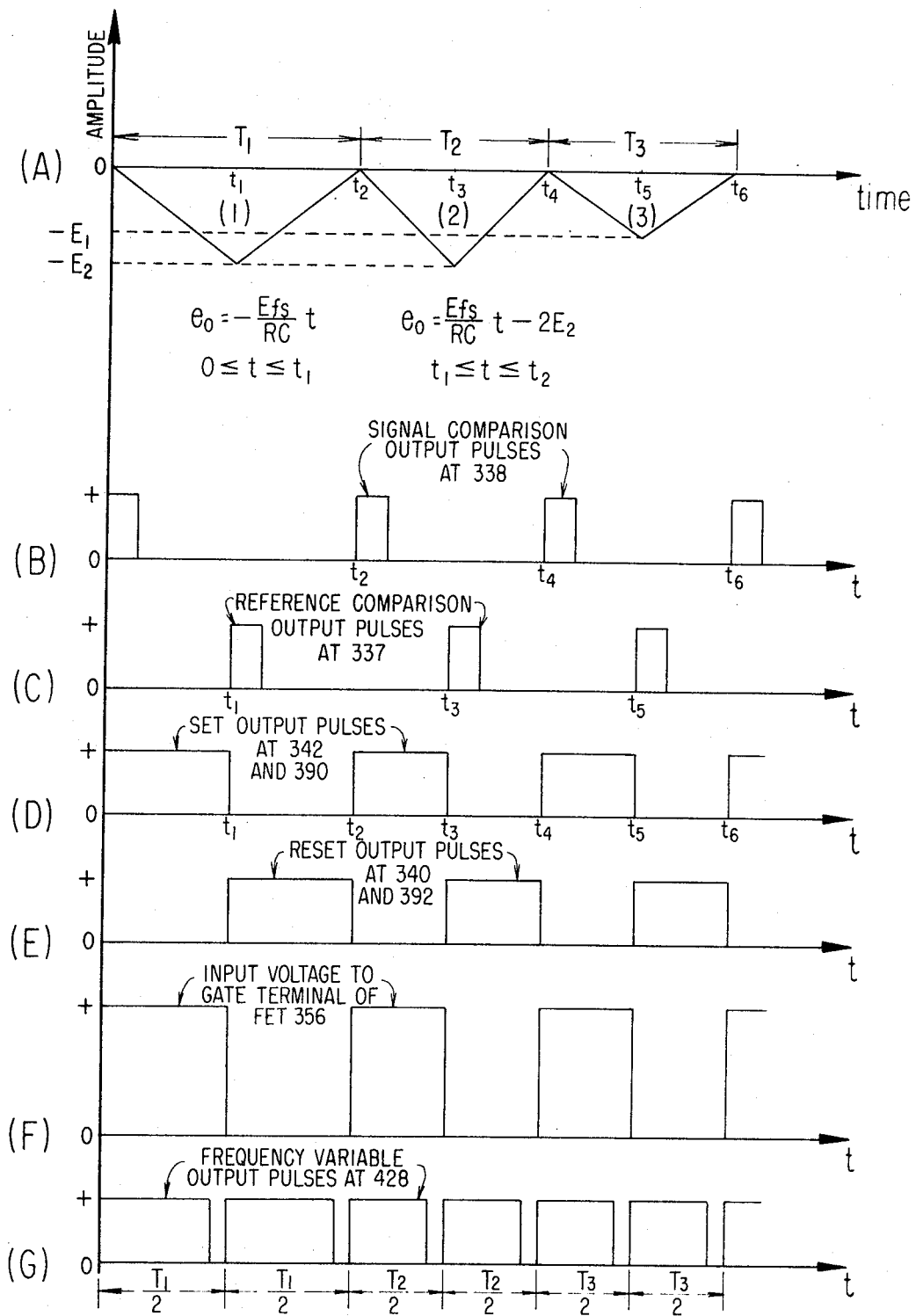
FIG. 7 is a view of several wave forms representative of various points in the voltage to frequency converter circuits of FIG. 4.

Immediately preceding the zero reference ordinant for time in FIG. 7, assume that the output voltage of logic amplifier 294 is in its low state corresponding to the absence of a pulse on conductor 338. Logic amplifier 284 is in its high output state and provides a high input state to one of the inputs of logic amplifier 294 through conductor 339. Assuming logic amplifier 292 is in its high output state, this voltage is coupled through conductor 340 to the remaining input of logic amplifier 294 in order to maintain the low output state of logic amplifier 294. It should be remembered that the low output state of logic amplifier 294 is cross-coupled to one of the inputs of logic amplifier 292 through conductor 344. The remaining input terminal of logic amplifier 292 is at a high level corresponding to the absence of an output pulse on conductor 337 with the associated inversion through logic amplifier 282. When a pulse of voltage appears on conductor 338, inversion takes place through logic amplifier 284, and conductor 339 presents the low level state to the input of logic amplifier 294 and changes the output of logic amplifier 294 to its high level state according to conventional flip-flop set action. This high level state on conductor 342 is maintained through cross-coupling on conductor 340 and the return of the input on conductor 339 to its high level state after the first pulse in FIG. 7(B) has diminished to zero. This diminution is in a relatively short interval of time. Reference to FIG. 7(D) shows the set output pulse on conductor 342 at a high level state during the time interim from zero to $t_1$ accordingly.

At time $t_1$, the output pulse from operational amplifier 272 is conducted to one of the inputs of logic amplifier 282 through conductor 337. The inversion through logic amplifier 282 applies a low level input to logic amplifier 292 through conductor 346 in order to change the output state of logic amplifier 292 from a low level to a high level. This change resets the output state of logic amplifier 294 from a high to a low level by cross-coupling the high level output of logic amplifier 292 to one of the inputs of logic amplifier 294 by conductor 340. The high level state of logic amplifier 292 is maintained by the cross-coupling action of the low level output state of logic amplifier 294 back to one of the inputs by conductor 344 and the return of the input signal to logic amplifier 292 on conductor 346 back to its high level state. This occurs after the duration of the pulse beginning at time $t_1$ in FIG. 7(C) which is of relatively short duration. The high level pulse output on conductor 340 is maintained during the time interval from $t_1$ to $t_2$ as shown in FIG. 7(E) until the next cycle of operation which begins at time $t_2$ and which corresponds to the generation of the pulse at $t_2$ by operational amplifier 274 as shown in FIG. 7(B).

The set output pulses on conductor 342 form an input to the NAND inverter amplifier 296 which functions in a conventional manner to provide a high level output when the input on conductor 342 is at a low level and vice versa. The buffer gate amplifier 300 includes the NPN transistor 301 which provides a high level output at its collector terminal when the input voltage on its base is at a low positive level with respect to the voltage on its emitter and a low level voltage at the collector when the voltage on its base is at a relatively high positive level. As can be understood from this analysis of its operation, buffer gate amplifier 300 serves as an amplifier of the gating signal provided at its base terminal and also acts as an inversion device for this signal. The output voltage at the collector of transistor 301 is thus in time phase with the pulse signal on conductor 342 after having passed through two stages of inversion.

The voltage at the collector of transistor 301 is applied to the gate terminal of the P-channel FET 302 through conductor 356. The input voltage to the gate terminal of FET 302 is shown in FIG. 7(F)), and the high level state of this voltage is shown to occur during the same time intervals as the output pulses on conductor 342 shown in FIG. 7(D). During the application of a positive voltage to the gate terminal of a P-channel FET, its drain-source resistance is at a relatively high level with respect to the level of its drain source resistance when the voltage applied to its gate terminal is at a low voltage or zero level. The switching action of FET 302 in this manner prevents the output signal from operational amplifier 278 from being applied to the negative input terminal of operational amplifier 276 during the first half period of each of the triangular wave forms (1), (2), (3) of FIG. 7(A). This action also provides a low resistance conductive path from the output of operational amplifier 278 to the negative input terminal of operational amplifier 276 during the second half cycle of these triangular wave forms. This action of FET 302 is reflected in the equations of operation (4) and (5), previously set forth, and results in the inclusion of a term $-2E_{fs}$ in the integrand of equation (5) as well as its exclusion from equation (4). As previously set forth, equation (4) defined the operation of amplifier 276, in conjunction with capacitor 320 and resistor 304, during the first half period of the triangular wave forms in FIG. 7(A). Equation (5) defined its operation over the second half period of the triangular wave forms. It should now be understood that the operation of the dual integrator ratio circuit 268 is dependent upon the combined operation of the comparator circuit 270, the dual inverter stage 280, the flip-flop stage 290, as well as inverter amplifier 296, buffer gate amplifier 300 and the switching action of FET 302 in conjunction with operational amplifiers 276 and 278.

The operation of the frequency doubling circuit 376, within the voltage to frequency converter 240, will also be described with reference to the wave forms shown in FIG. 7. The flip-flop stage 378 is generally equivalent in operation to the flip-flop stage 290 included as part of the dual integrator ratio circuit 268. The output signal from logic amplifier 282 is connected to one of the inputs of logic amplifier 386 through conductor 372, and the output signal of logic amplifier 284 is connected to one of the inputs of logic amplifier 388 through conductor 374. Cross-coupling of the logic amplifiers 386 and 388 by conductors 390, 392, along with the above-mentioned input connections, provides a series of pulses at the output of logic amplifier 386 which are substantially similar in shape and timing as the output pulses of logic amplifier 292. The pulses at the output of logic amplifier 386 are shown in FIG. 7(E) and have the related timing with respect to the other wave forms shown in FIG. 7. The pulse output at the output terminal of logic amplifier 388 corresponds to the pulse output of logic amplifier 294 and thus has the timing relationship shown in FIG. 7(D). The output pulses at the output terminals of logic amplifiers 386, 388 are used in order to provide a frequency variable train of output pulses. These pulses have a period equal to one half the period of the triangular wave forms shown in FIG. 7(A) corresponding to a frequency twice that of the triangular wave forms. The double frequency is used in order to decrease the response time of the frequency to voltage converter 240 as well as to reduce the ripple factor of any subsequent devices, connected to the pulse output terminal 428, which are frequency dependent.

The pulses of voltage at the output of logic amplifier 386, corresponding to FIG. 7(E), are differentiated by action of capacitor 396 in conjunction with resistor 400 in order to form voltage spikes of short duration to control the on-state of NPN transistor 398. The output pulses of logic amplifier 388, corresponding to FIG. 7(D), are similarly differentiated by action of capacitor 418 in conjunction with resistor 422 to provide voltage spikes of short duration to control the similar NPN transistor 420. The output voltage from the collectors of transistors 398, 420 are applied to the input terminals of logic amplifier 382 through conductors 406, 427, respectively, in order to gate the output signal of logic amplifier 382 from its low to high level output state each time a spike of voltage is received at the base terminal of either transistor 398 or transistor 420. This action may be readily understood in view of the fact that logic amplifier 382 is a NAND-type amplifier. The output pulses on conductor 413 may be used directly by coupling them into a frequency counting device in order to provide a measure of volumetric flow rate. The circuit under consideration, however, applies the output pulses on conductor 413 into one of the inputs of a second NAND logic amplifier which has its remaining input terminal maintained at a high level of voltage in order to act as an inverter for the pulses applied on conductor 413. The output pulses of logic amplifier 384 present at terminal 428 are shown in FIG. 7(G). This wave form illustrates that the voltage at terminal 428 is normally at its high level state, with the exception of the time interims during which the spikes of voltage are applied to the individual base terminals of transistor 398, 420. By comparing the period of the pulses shown in FIG. 7(G) with the time period of the triangular wave forms shown in FIG. 7(A), it may be seen that the periodicity of the pulses is twice that of the periodicity of the triangular wave forms. The pulse output at terminal 428 is connected to the pulse to voltage converter 430, the structure and operation of which will be considered next.

PULSE TO VOLTAGE TO CURRENT CONVERTERS

Figure 5:
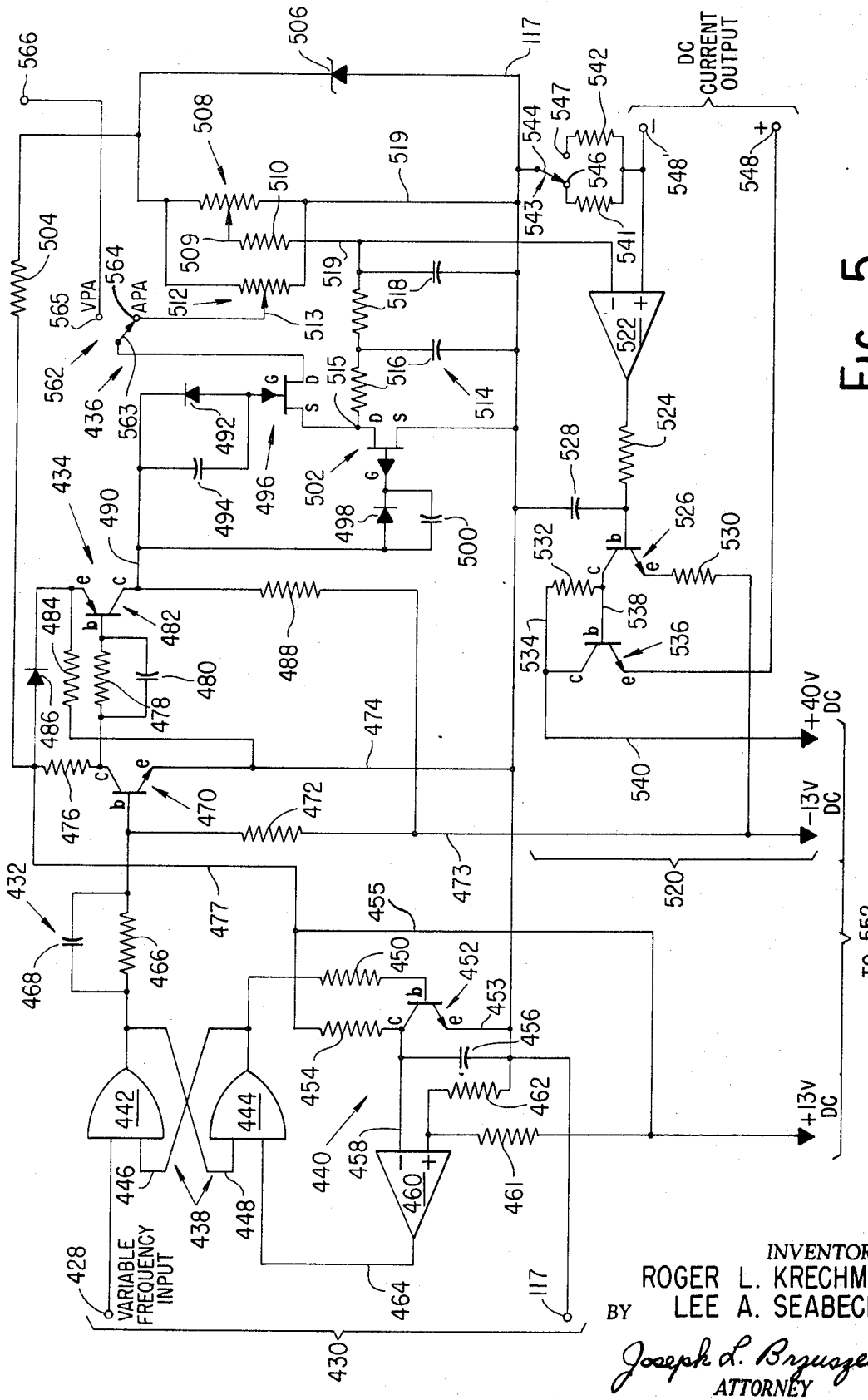

The pulse to voltage converter 430, illustrated in FIG. 5, includes a constant pulse width circuit 432, a pulse converter stage 434, a series-shunt chopper circuit 436 and a voltage averaging network 514. The constant pulse width circuit 432 includes a flip-flop stage 438 and a single-short multivibrator circuit 440.

The flip-flop stage 438 includes a pair of logic amplifiers 442, 444 cross-coupled in the conventional manner by conductors 446, 448. The remaining input terminal of logic amplifier 442 is connected directly to terminal 428 from the output of the voltage to frequency converter 240. The output terminal of logic amplifier 444 is connected through a resistor 450 to the base terminal of an NPN transistor 452 included within the single-shot multivibrator circuit 440. The emitter terminal of transistor 452 is connected through conductor 453 to the reference ground conductor 117, and its collector is connected to a resistor 454 which is in turn connected through conductor 455 to a positive D.C. source of operating voltage from the secondary unit power supply 552. A capacitor 456 is connected between the collector and emitter terminals of transistor 452. The single-shot multivibrator circuit 440 also includes an operational amplifier 460 having its negative input terminal connected through conductor 458 to the collector of transistor 452. Its positive input terminal is connected through a resistor 462 to the ground reference conductor 117. The positive input terminal of operational amplifier 460 is also connected through a resistor 461 to conductor 455 in order to serve a biasing function for the operational amplifier 460. The output terminal of operational amplifier 460 is connected through a conductor 464 to the remaining input terminal of logic amplifier 444.

The output terminal of logic amplifier 442 is connected through a resistor 466 in parallel with a capacitor 468 to the base terminal of an NPN transistor 470 included within the pulse converter stage 434. A resistor 472 is connected from the base terminal of transistor 470 and through conductor 473 to a negative source of D.C. potential from the secondary unit power supply 552. The emitter terminal of transistor 470 is connected through conductor 474 to the reference ground conductor 117, and its collector is connected to a resistor 476 which is in turn connected through conductor 477 to conductor 455 for its positive D.C. operating voltage. The output voltage of transistor 470 is taken from its collector terminal through a resistor 478, in parallel with a capacitor 480, to the base terminal of a PNP transistor 482. The transistor has its emitter terminal connected to a resistor 484 which is in turn connected to conductor 474 referenced to ground. The emitter terminal of transistor 482 is also connected to the cathode of a diode 486 which has its anode terminal connected to the junction of resistor 476 and conductor 477. The collector terminal of transistor 482 is connected to a resistor 488 which is in turn connected to conductor 473 for its negative D.C. operating voltage.

The output voltage from the collector terminal of transistor 482 is fed to the input of the series-shunt chopper circuit 436 by the conductor 490. The series portion of the chopper circuit includes a capacitor 494 connected in parallel with a diode 492 having its cathode connected to conductor 490 and its anode connected to the gate terminal of an N-channel FET 496. The FET 496 has its drain-source terminals connected in series with the voltage averaging network 514. The shunt portion of the chopper circuit includes a capacitor 500 connected in parallel with a diode 498 having its anode terminal connected to conductor 490 and its cathode terminal connected to the gate terminal of a P-channel FET 502. The FET 502 has its drain-source terminals connected in shunt with respect to the voltage averaging network 514. The source terminal of FET 502 is connected to the reference ground conductor 117, and its drain terminal is connected in common with the source terminal of FET 496, the latter FET having its drain terminal connected to the movable switch arm 563 of a single pole, double throw switch 562. Switch 562 has one of its fixed contact terminals 564, designated APA, connected to the movable contact arm 513 of a potentiometer 512. The potentiometer 512 is used for adjusting the amplitude of the voltage pulses on conductor 515 to the input of the voltage averaging network 514. The acronym APA is used to designate adjustable pulse amplitude, and, with the movable contact arm 563 in the position shown, the amplitude of the pulses may be adjusted over a predetermined range. The potentiometer 512 is connected between the reference ground conductor 117 and a resistor 504 which is in turn connected to the junction between resistor 476 and conductor 477 in order to provide a D.C. operating voltage for the above designated voltage divider network. A Zener diode 506 has its cathode terminal connected at the junction of potentiometer 512 and resistor 504, and its anode terminal is connected to the ground reference conductor 117 in order to provide voltage regulation.

The conductor 515 forms the input connection to the voltage averaging network 514 which includes a first resistor-capacitor filter stage 516 and a second resistor-capacitor filter stage 518. A bias potentiometer 508 is connected in parallel with the potentiometer 512, and the movable contact arm 509 of bias potentiometer 508 is connected through a resistor 510 to the junction between the resistor and capacitor of the second filter stage 518. By varying the position of the movable contact arm 509, a D.C. bias voltage is superimposed on the output voltage of the voltage averaging network 514, and, by way of conductor 519, the total value of D.C. voltage is applied to the voltage to current converter 520.

The voltage to current converter 520 includes an operational amplifier 522, a transistor amplifier 526 and an emitter follower transistor amplifier 536. The conductor 519 is connected to the negative input terminal of operational amplifier 522, and the output terminal of operational amplifier 522 is connected through a resistor 524 to the base terminal of the NPN transistor 526. The base terminal of transistor 526 is also connected through a filter capacitor 528 to the reference ground conductor 117, and this capacitor functions to filter out any A.C. signal components present on the output of operational amplifier 522 in order to isolate them from the amplifier stages 526, 536. The emitter of transistor 526 is connected to a resistor 530 which is in turn connected to conductor 473 for the negative D.C. operating voltage. The collector of transistor 526 is connected through conductor 538 to the base terminal of the NPN transistor 536, and the collector terminal of transistor 526 is connected through a resistor 532 to the collector terminal of transistor 536 by conductor 534. The junction of conductor 534 and the collector terminal of transistor 536 is connected to a positive D.C. operating voltage from the secondary unit power supply 552 by way of conductor 540. Since transistor amplifier 536 is to be used as an emitter follower current amplifier, the emitter terminal is connected to terminal 548 which forms the plus polarity D.C. current output terminal. The minus polarity D.C. current output terminal 548' is connected to the positive input terminal of operational amplifier 522.

A range current bias network is provided by the inclusion of a resistor 541 or a resistor 542 between the positive input terminal of operation amplifier 522 and the reference ground conductor 117. As shown in FIG. 5, a single pole, double throw switch 543 has its movable switch arm 544 connected to conductor 117 through fixed contact 546 and through resistor 541 to the positive input terminal of the amplifier 522. Switching the movable contact arm 544 to fixed contact 547 open circuits resistor 541 and selectively connects resistor 542 to the positive input terminal of the amplifier. By the appropriate choice of parameters in the various circuits described herein, the D.C. current output may range between 10–50 ma with the inclusion of a resistor 541 of a particular value, and may also range between 4–20 ma upon connection of resistor 542 when resistor 542 is two and one-half times the value of resistor 541. It should be understood that this is one convenient way of selectively choosing the D.C. output current range for a particular range of flow rates compatible with the flowmeter system. It should also be understood that a plurality of adjustable contacts are provided throughout the flowmeter system which allow a wide range of flexibility of adjustment and calibration.

The single pole, double throw switch 562 has a fixed contact 565, designated VPA, connected to a terminal 566 which is connected to the output of a linearity network 560 as shown in FIG. 1. The linearity network 560 receives an input from a density gage 11 included within the primary unit A of the flowmeter system as further shown in FIG. 1. The density gage 11 may be a nuclear density gage of the type that forms a voltage output proportional to the density of fluid flow through the conduit 12. Since nuclear density gages often provide a non-linear response, the inclusion of the linearity network 560 is usually desirable. When the movable switch arm 563 of switch 562 electrically contacts fixed contact 565, the D.C. output of the linearity network 560 controls the amplitude of the voltage pulses introduced into the voltage averaging network 514 on conductor 515. The acronym VPA is formed from the words variable pulse amplitude and thus characterizes the operation of the pulse to voltage converter 430 during this particular mode of operation. When operating in either the APA mode or the VPA mode, the D.C. output current available at terminals 548, 548' is an average of the product of pulse width multiplied by pulse amplitude multiplied by the frequency of the pulses to the input of the voltage averaging network 514 on conductor 515. In the APA mode of operation, the pulse amplitude is adjusted to a fixed level, and this fixes the pulse amplitude term in the above-named multiplication. The pulse width is fixed by the operation of the single-shot multivibrator circuit 440, and, therefore, the D.C. output current at terminals 548, 548' varies directly proportional to the remaining factor in the multiplication, the pulse frequency. In contrast, the VPA mode of operation varies the amplitude of the pulses proportional to the density of the fluid flowing through the conduit, the D.C. output current available at terminals 548, 548' is, therefore, a product of two variables in the multiplication, the pulse frequency and the pulse amplitude.

OPERATION OF THE PULSE TO VOLTAGE TO CURRENT CONVERTER

The operation of the pulse to voltage converter 430 and the voltage to current converter 520 may be more clearly understood with reference to the wave forms in FIG. 8(A)–(H), which are representative of the various points in the circuit of FIG. 5. These wave forms correspond exactly with the time graduations for the wave forms shown in FIG. 7.

Figure 8:
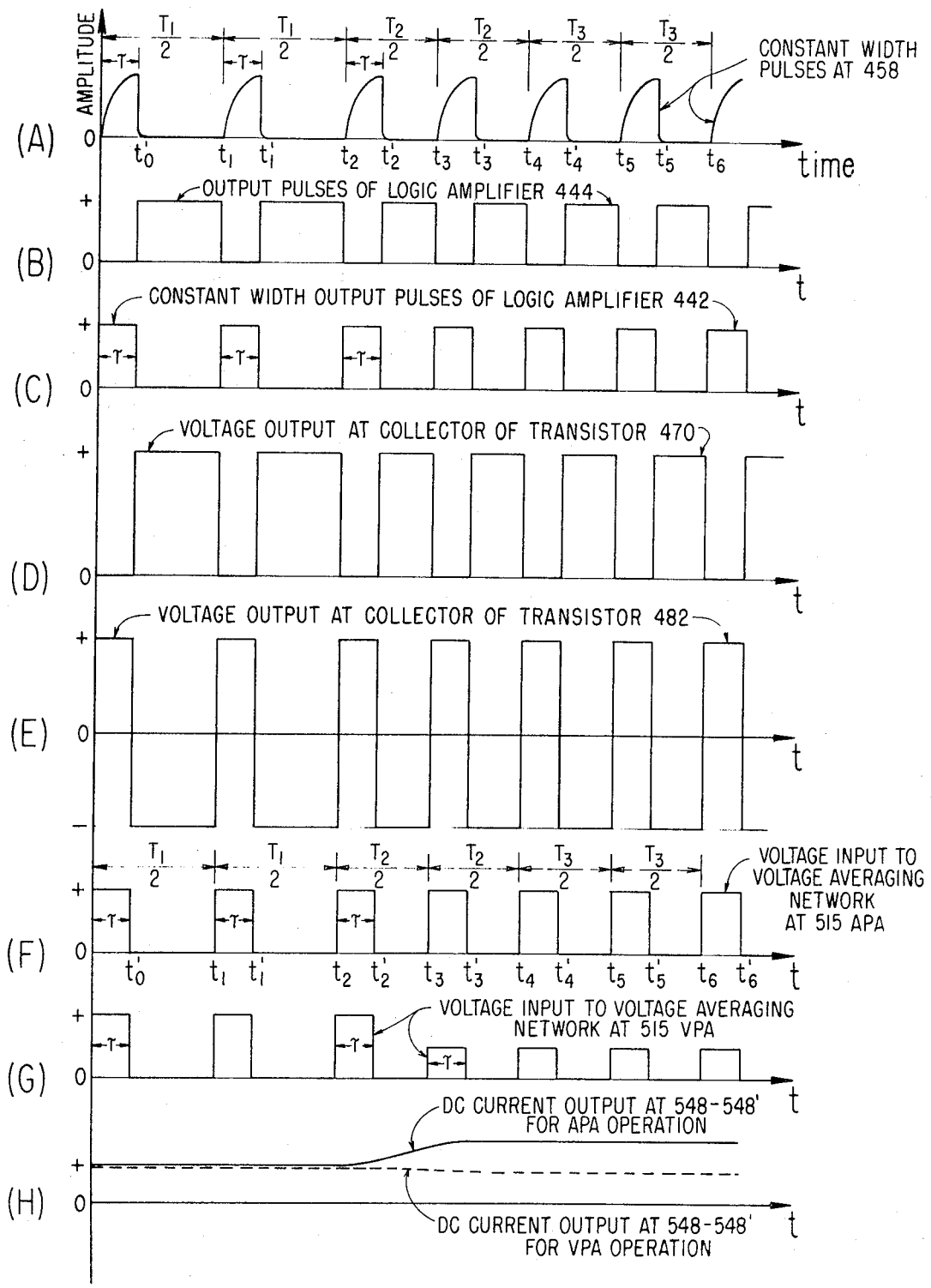
FIG. 8 is a view of several wave forms representative of various points in the circuits of FIG. 5.

Referring now to the wave forms in FIG. 7(G) and FIG. 8(A), in conjunction with the constant pulse width circuit 432 shown in FIG. 5, the voltage level of the first pulse cycle in FIG. 7(G) is substantially the same for the entire period $T_1/2$. The wave forms in FIG. 8 occupy the same relative time intervals as the wave forms in FIG. 7, and the time graduations on the abscissae are designated in a corresponding fashion. The wave form shown in FIG. 8(A) represents the voltage produced across the terminals of the capacitor 456 in the single-shot multivibrator circuit 440. The wave form in FIG. 8(A) is produced by charging the capacitor 456 through the resistor 454 during each time interval designated as $\tau$, and the capacitor 456 is discharged through the collector-emitter junction of transistor 452 during the relatively short time interim indicated by the nearly vertical return of the amplitude of the pulses to the abscissa. This wave form is generated by the transistor 452 being in its off state during the charging cycle of capacitor 456 and being in its on state during the discharge cycle of the capacitor 456. During the charging cycle or capacitor 456, the output voltage of operational amplifier 460 provides a positive input voltage to the input terminal of logic amplifier 444, and the output voltage of logic amplifier 444 is at a low level corresponding to transistor 452 being in its off state during the charging cycle. The low output level of logic amplifier 444 is cross-coupled to one of the inputs of logic amplifier 442 through conductor 446. The remaining input terminal of logic amplifier 442 is at a positive voltage level since it is connected to terminal 428 which is at a positive voltage level corresponding to the first portion of the pulse shown in FIG. 7(G) during the period $T_1/2$. Logic amplifier 442, like logic amplifier 444, is NAND in its operation, and thus the output voltage is at a positive value during the above set of input voltages. This positive output voltage is cross-coupled to the remaining input of logic amplifier 444 by conductor 448.

The parameters for capacitor 456 and resistor 454 are chosen so that an appropriate RC time constant is associated with these elements. The time constant is such as to allow capacitor 456 to charge to the value of voltage on the positive input terminal of operational amplifier 460 within the time interval of the positive portion of the frequency variable pulses at terminal 428 at the maximum frequency of these pulses.

When the voltage on capacitor 456 reaches the level of voltage on the positive input terminal of operational amplifier 460, the output voltage of operational amplifier 460 is near zero. This zero value of voltage changes one of the input states of logic amplifier 444 to a low state thus changing the voltage at its output terminal to a high state positive value. The positive output voltage of operational amplifier 444 is applied to the base of transistor 452 through resistor 450, and this changes transistor 452 to its on state. The positive output voltage of logic amplifier 444 is cross-coupled to one of the inputs of logic amplifier 442 through conductor 446. Since the other input terminal of logic amplifier 442 is at a positive voltage level, the output voltage of logic amplifier 442 changes to a low state which in turn is cross-coupled by conductor 448 back to the remaining input terminal of logic amplifier 444. The time interim for discharging capacitor 456 is relatively short since the collector-emitter resistance of transistor 452 is substantially a short circuit to the ground reference conductor 117. After the discharge of capacitor 456, the positive input terminal of operational amplifier 460, maintained at a positive voltage level throughout the operation, provides a differential of input potential to operational amplifier 460 resulting in a positive output voltage on conductor 464. This voltage is input to logic amplifier 444, thus maintaining the output voltage of logic amplifier 444 at a positive level to keep transistor 452 in its on state in order to prevent capacitor 456 from recharging until the next cycle. When the value of voltage at terminal 428 goes to zero in the first time period $T_1/2$ in Fig. 7(G), the output voltage of logic amplifier 442 returns to a positive voltage level, and this voltage is cross-coupled by conductor 448 to change the output voltage of logic amplifier 444 back to a zero level. This renders transistor 452 non-conductive and reinstitutes the charging cycle through resistor 454 and capacitor 456 at time $t = t_1$. This operation is shown by the wave forms in FIG. 8(A), (B), (C) and is redundant for each cycle of operation.

The output pulses of logic amplifier 442 have a constant pulse width $\tau$ and a periodicity which varies according to the periodicity of the frequency variable output pulses at terminal 428. The constant width output pulses of logic amplifier 442 are applied to the base of transistor 470 of the pulse converter stage 434 in order to gate this transistor to provide the output voltage at its collector as shown in FIG. 8(D). The amplified pulses of FIG. 8(D) are in turn used to gate transistor 482 to provide the voltage pulses in FIG. 8(E) which are taken at its collector. The positive and negative going pulses of FIG. 8(D) are applied through conductor 490 to the input of the series-shunt chopper circuit 436. A positive voltage on conductor 490 renders diode 498 conductive and applies a positive voltage to the gate terminal of the P-channel FET 502 which causes its drain-source resistance to be high in value and acts substantially as an open circuit. The positive voltage on conductor 490 is blocked from the gate terminal of N-channel FET 496 by the oppositely-poled diode 492, and FET 496 has a low resistance across its drain-source terminals which is substantially a short circuit during the positive voltage pulse applied through conductor 490. During the negative voltage pulse on conductor 490, as shown in FIG. 8(E), the drain-source resistance of FET 502 is low, and the drain-source resistance of FET 496 is high, thus providing a switching action identical in operation with that of the series-shunt chopper circuit 172 in FIG. 3.

When it is desired to operate the system thus described to provide a measure of flow rate per se (APA operation), switch arm 563 electrically contacts fixed contact 564. The value of the D.C. voltage on the contact arm 513 of potentiometer 512 is applied through the drain-source junction of FET 496 and through conductor 515 to the voltage averaging network 514. According to the above-described switching action the wave form shown in FIG. 8(F) results. The pulses in FIG. 8(F) have a constant pulse width $\tau$ equal in time to the charging rate previously defined and a time periodicity inversely proportional to the rate of flow of fluid. The filtering action of the resistor-capacitor stages 516, 518 averages these pulses in order to provide a D.C. voltage on conductor 519 which, when superimposed on the D.C. voltage from the movable contact arm 509 of the bias potentiometer 508, provides a voltage input to the voltage to current converter 520.

The D.C. voltage on conductor 519 is applied to the negative input terminal of operational amplifier 522 in order to vary its output voltage accordingly. The amplifier 526 and the current amplifier 536, arranged to operate as an emitter follower, provide a D.C. current output at terminals 548, 548' which is shown in FIG. 8(H) (solid curve), and this current is directly proportional to the frequency of the voltage pulses shown in FIG. 8(F). An appropriate range of D.C. output current at terminals 548, 548' may be chosen for a particular range of fluid flow rates, and the position of switch 543 is selected accordingly. It should be noted that the D.C. current output shown in FIG. 8(H) is initially at a lower value, corresponding to the time period $T_1$ in FIG. 7(A), and changes to a higher value which remains constant over the time periods $T_2$ and $T_3$ in FIG. 7(A).

When mass flow rate of fluid is the variable to be measured, switch arm 563 of the switch 562 is moved into electrical contact with fixed terminal 565, thus corresponding to the VPA mode of operation. The linearity network 560 provides a D.C. voltage output which is proportional to the density of fluid flowing at a particular rate. The D.C. output voltage of the linearity network 560 varies the amplitude of the pulses having a fixed pulse width through switching action of the series-shunt chopper circuit 436. These variable amplitude pulses are applied to the voltage averaging network 514 on conductor 515. The action of the linearity network 560 in establishing the amplitude of the pulses thus applied is shown in FIG. 8(G). In FIG. 8(G), it should be noted that the amplitude of the pulses has changed from a higher to lower amplitude during the second half cycle of the time period $T_2$, of FIG. 7(A). This indicates that the density of the fluid has changed after the first half cycle of time period $T_2$ and just after the flow rate has changed from a lower to higher rate. The D.C. output voltage of the voltage averaging network 514 is superimposed on the D.C. bias voltage from potentiometer 508, and this voltage is applied to the voltage to current converter 520 which operates in the same manner previously described. The D.C. current output at terminals 548, 548' is shown in FIG. 8(H) (dashed curve) illustrating that the D.C. current output is at a higher lever during the period $T_1$, corresponding to a constant rate of fluid flow with a constant density of fluid, and changing to a lower value of current during the time period $T_2$ and remaining constant over the time period $T_3$. This indicates that the lower amplitude of the pulses in FIG. 8(G), corresponding to a change in fluid density has overridden the effect of the increase in flow rate during the time intervals $T_2$ and $T_3$. The range of operation of the flowmeter system described herein may also be selectively predetermined for mass flow measurements in the VPA mode of operation by the inclusion of a resistor 541 or a resistor 542 by selective action of switch 543.

The invention has been described with reference to a particular embodiment. Since certain changes may be made in the above construction without departing from the scope of the invention, it is intended that all matters contained in the above description and shown in the accompanying drawings shall be interpreted as illustrative and not limiting.

What we claim as new and desire to secure by Letters Patent of the United States is:

1. A measuring system for comparing the relative magnitudes of a first and a second D.C. input signal, said system comprising:
    means for symmetrically integrating said first signal between time period intervals proportional to its magnitude relative to the magnitude of said second signal;
    switching means for periodically reinitiating said symmetrical integrating cycle; and
    pulse generating means responsive to the half-period cycles of said symmetrical integrating means so that output pulses are generated at a frequency which is a multiple of said integrating cycle.

2. The measuring system of claim 1 wherein said symmetrical integrating means includes a pair of substantially matched operational amplifiers each having a pair of oppositely poled input terminals and an output terminal, said amplifiers having one set of like poled input terminals connected in common and the other set of like poled input terminals coupled to said first input signal, said first amplifier having twice the gain of said second amplifier and said second amplifier including a feedback capacitor for integral action connected between its output terminal and its said input terminal coupled to said first input signal, said first amplifier having its output terminal coupled to the feedback input terminal of said second amplifier through said switching means so that the output signal at the output terminal of said second amplifier has a substantially triangular wave form with a half-wave periodicity directly proportional to the ratio of said second input signal and said first input signal.

3. The measuring system of claim 2 wherein said switching means includes means for comparing the output signal from said second amplifier with both said second input signal and with a ground reference potential, said comparing means providing a first pulse output whenever the output signal from said second amplifier is substantially equal to said second input signal and providing a second pulse output whenever the output signal from said second amplifier is substantially equal to said ground reference potential.

4. The measuring system of claim 3 wherein said switching means further includes flip-flop means for controlling the application of the output signal of said first amplifier to the feedback input terminal of said second amplifier, said flip-flop means being responsive to said first pulse output of said comparing means to apply the output signal of said first amplifier until said flip-flop means is reset in response to said second pulse output of said comparing means.

5. The measuring system of claim 3 wherein said pulse generating means responsive to the half-period cycles of said symmetrical integrating means includes flip-flop means for responding to said first and second output pulses of said comparing means, differentiating circuit means coupled to the outputs of said flip-flop means for providing a gating spike in time synchronism with each of said output pulses of said comparing means, and summing means responsive to the gating spikes for providing output pulses at twice the frequency of said integrating cycle.

6. In a measuring system, a frequency to voltage converter comprising:

means for producing a frequency variable train of pulses, each of the pulse cycles of said train of pulses having the corresponding periodicity of the variable input frequency and each said pulse having a substantially constant pulse width;

means for voltage converting said pulse cycles of said train to form a substantially square wave signal varying plus and minus of a reference level, said deviations of one polarity having a substantially constant width synchronized with said constant width pulses and said deviations of said other polarity being synchronized with the remainder of each pulse cycle;

a voltage source having an output signal;

series-shunt chopper means, coupled to said square wave signal, for modulating said voltage source output signal during said plus deviations;

flip-flop means for gating said voltage converting means and single shot multi-vibrator means, responsive to said flip-flop means, for resetting said flip-flop means to produce said pulses having a substantially constant pulse width; and means for averaging the modulated output signal of the voltage source to provide an averaged output voltage which is proportional to the product of the modulated output signal of the voltage source and the input frequency.

7. The measuring system of claim 6 wherein said voltage source having an output signal includes second output signal means for producing an adjustable D.C. voltage which when added to the averaged output voltage of said averaging means provides an adjustable D.C. bias.

* * * * *